United States Patent [19]
Yamamoto

[11] Patent Number: 6,061,300
[45] Date of Patent: May 9, 2000

[54] METHOD OF IMAGING THE PERMEABILITY AND FLUID CONTENT STRUCTURE WITHIN SEDIMENT

[75] Inventor: Tokuo Yamamoto, 12200 SW. 89th Ave., Miami, Fla. 33176

[73] Assignees: Kawasaki Steel Corporation, Japan; Tokuo Yamamoto, Miami, Fla.

[21] Appl. No.: 09/107,675

[22] Filed: Jun. 30, 1998

[51] Int. Cl.[7] .................................................. G01V 1/40
[52] U.S. Cl. ............................... 367/57; 367/39; 181/102
[58] Field of Search ................................. 367/57, 25, 39; 181/102, 106

[56] References Cited

U.S. PATENT DOCUMENTS

| | | |
|---|---|---|
| 4,805,725 | 2/1989 | Paulsson ................................. 181/106 |
| 5,142,500 | 8/1992 | Yamamoto et al. . |
| 5,406,530 | 4/1995 | Yamamoto . |

OTHER PUBLICATIONS

Anselmetti, F.S., Salis, G.A. von, Cunningham, K.J., and Eberli, G.P., "Acoustic properties of Neogene carbonate Neogene Carbonates and Siliciclastics from the subsurface of the Florida Keys: implications for seismic reflectivity," Marine Geology, vol. 144, (1997), p. 9–31.

Biot, M.A., "Theory of Propagation of Elastic Waves in a Fluid–Saturated Porous Solid. I. Low–Frequency Range," *J. Acoust. Soc. Am.*, vol. 28, No. 2, Mar. 1956, p. 168–178.

Biot, M.A., "Theory of Propagation of Elastic Waves in a Fluid–Saturated Porous Solid. II. Higher–Frequency Range," *J. Acoust. Soc. Am.*, vol. 28, No. 2, Mar. 1956, p. 179–191.

Bregman, N.D., Bailey, R.C., and Chapman, C.H., "Crosshole seismic tomography," *Geophysics*, vol. 54, No. 2, (Feb. 1989), p. 200–127, 11 Figs.

Bregman, N.D., Chapman, C.H., and Bailey, R.C., "Travel Time and Amplitude Analysis in Seismic Tomography," *J. Geoph. Res.*, vol. 4, No. B6, Jun. 10, 1989, p. 7577–7587.

Dvorkin, J., and Nur, A., "Dynamic porelasticity: A unified model with the squirt and the Biot mechanism," *Geophysics*, vol. 58, No. 4, (Apr. 1993) p. 524–532, 6 Figs.

Jones, Terry D., "Pore fluids and frequency–dependent wave propagation in rocks," Geophysics, vol. 51, No. 10 (Oct. 1986) p. 1939–1953, 18 Figs., 2 Tables.

Yamamoto, T., "Acoustic Imaging of Permeability of Limestone Formations by Crosswell Tomography," Geo–Acoustics Laboratory, RSMAS, University of Miami, Miami, Florida, 33149, USA, p. 2 and 3 of 19.

Yamamoto, T., "Acoustic propagation in the ocean with a poro–elastic bottom," *J. Acoust. Soc. Am.*, 73(5), May 1983, p. 1587–1596.

Yamamoto, T., "Acoustic scattering in the ocean from velocity and density fluctuations in the sediments," Geo–Acoustics Laboratory, RSMAS, University of Miami, Miami, Florida, 33149, USA, Abstract, p. 1–32, 1 Table, 12 Figs.

(List continued on next page.)

*Primary Examiner*—Christine Oda
*Assistant Examiner*—Anthony Jolly
*Attorney, Agent, or Firm*—Austin R. Miller

[57] ABSTRACT

A non-destructive method of measuring physical characteristics of a medium, such as uncemented sediment, sandstone, or limestone. A pseudo-random code is generated and is used to generate a pseudo-random acoustic signal. This signal is transmitted into the medium to be measured through the use of a transducer, such as a piezoelectric element, and is received by a plurality of hydrophones. The received signal is then processed to obtain an image of its velocity and attenuation. A universal geoacoustic model of the medium for a given set of measured data is determined, and the model is solved to obtain a pair of permeability-porosity results for the medium. The one of this pair of permeability-porosity results which is correctly indicative of the physical characteristics of the medium is then determined.

11 Claims, 39 Drawing Sheets

(24 of 39 Drawing Sheet(s) Filed in Color)

OTHER PUBLICATIONS

Yamamoto, T., "Imaging the permeability–porosity structure within the near–surface sediments of Tokyo by acoustic crosswell tomography," Geo–Acoustics Laboratory, RSMAS, Univesity of Miami, Miami, Florida, 33149, USA, p. 1–5.

Yamamoto, T., "A Poro–Elastic Model of Extreamly Permeable Limestone for Permeability Imagining," Geo–Acoustics Laboratory, Applied Marine Physics Division, RSMAS, University of Miami, Miami, Florida, 33149, USA, p. 1–18, 3 Tables, 6 Figs.

Yamamoto, T., Nye, T., and Kuru, M., "Imaging the permeability structure of a limestone aquifer by croswell acoustic tomography," *Geophysics*, vol. 60, No. 6 (Nov.–Dec. 1995), p. 1634–1645, 12 Figs., 1 Table.

Yamamoto, T., Nye, T., and Kuru, M., "Porosity, Permeability, Shear Strength: Cross–Well Tomography Below an Iron Foundry," Geo–Acoustics Laboratory, Applied Marine Physics Division, RSMAS, University of Miami, Florida, 33149, USA, p. 1–31, 8 Figs.

Yamamoto, T., and Sakakibara, J., "Crosswell tomography imaging of the permeability structure within a sandstone oil field," Geo–Acoustics Laboratory, Applied Marine Physics Division, RSMAS, University of Miami, Florida, 33149, USA, p. 5–9 of 19 (5 Figs.).

Yamamoto, T., Trevorrow, M., Badiey, M., and Turgut, A., "Determination of the seabed porosity and shear modulus proviles using a gravity wave inversion," *Geophys J. Int.* (1989) 98, p. 173–182.

Well Names and Configuration
C-13 APT Site, Broward County

PERMEABILITY AND POROSITY COMPARISONS BETWEEN THE SUPER-K INVERSION
VS. PUMPING TESTS AND NEUTRON DENSITY LOGS

SFWMD TEST SITE: LIMESTONE FORMATION AT 1157 FEET DEPTH

Permeability by Pumping Tests: k=89.0 darcies (SFWMD, 1997)
Porosity by Neutron Logs: φ=.440+/−.050 (Shulumberge, 1993)

| Frequency (kHz) | $V_p$ (m/s) | $Q^{-1}$ | ACOUSTIC DATA $k_1$ (darcies) | $\phi_1$ | $k_2$ (darcies) | $\phi_2$ |
|---|---|---|---|---|---|---|
| 2 | 2718 | .0605 | 120.0 | .458 | 24.4 | .440 |
| 4 | 2814 | .0405 | 93.2 | .448 | 7.58 | .425 |
| 8 | 2880 | .0239 | 78.5 | .440 | 2.18 | .417 |
| 12 | 2862 | .0133 | 99.4 | .445 | 0.78 | .417 |
| Average (stand.dev.) | ---- | ---- | 97.8 (14.9) | .448 (.007) | 8.73 (9.39) | .427 (.009) |

Fig. 16A

PERMEABILITY AND POROSITY COMPARISONS BETWEEN THE SUPER-K INVERSION
VS. PUMPING TESTS AND NEUTRON DENSITY LOGS

SFWMD TEST SITE: LIMESTONE FORMATION AT 1514 FEET DEPTH

Permeability by Pumping Tests: k=33.2 darcies (SFWMD, 1997)
Porosity by Neutron Logs: $\phi$ =.390+/-.110 (Shulumberge, 1993)

| Frequency (kHz) | $V_p$ (m/s) | $Q^{-1}$ | ACOUSTIC DATA $k_1$ (darcies) | $\phi_1$ | $k_2$ (darcies) | $\phi_2$ |
|---|---|---|---|---|---|---|
| 2 | 3545 | .0712 | 33.7 | .342 | 125.0 | .357 |
| 4 | 3580 | .0553 | 33.7 | .345 | 22.7 | .342 |
| 8 | 3616 | .0323 | 35.0 | .357 | 4.75 | .352 |
| 12 | 3652 | .0204 | 35.7 | .342 | 1.77 | .326 |
| Average (stand.dev.) | ---- | ---- | 34.5 (0.90) | .347 (.006) | 38.5 (50.5) | .344 (.012) |

Fig. 16B

METHOD OF IMAGING THE PERMEABILITY AND FLUID CONTENT STRUCTURE WITHIN SEDIMENT

FIELD OF THE INVENTION

The present invention relates to a method of imaging the permeability and fluid content structure within sediments, more particularly to the use of cross-well tomography to image geological structures, and more particularly to the use of cross-well tomography to image the porosity and shear strength in geological structures.

BACKGROUND OF THE INVENTION

Imaging the permeability structure within sediments has been a challenge to exploration geophysicists for many years. The results so far have been very limited. In practice, the most reliable method of measuring the permeability within sedimental earth is through the use of a pumping test. This method requires at least two wells, one to constantly pump water out at a constant rate and another to observe the change in the water level. These two wells must also penetrate down to the layer of interest, and the well section above the layer of interest must be cased to isolate the layer. In such conventional systems, the two wells have to be separated by a horizontal distance of at least 500 ft.

However, this method has the significant disadvantage that it is very expensive and time-consuming, and only produces the measurement of an average permeability of the layer between the wells. This method also does not provide any information concerning the spatial distribution of permeability, known as the permeability image.

Cross-well seismic tomography has been widely used to image geological structures within the earth. Usually, the seismic velocity and attenuation information are inverted from measured arrival times and amplitudes of the seismic pulses received in a well, which were originated from another well separated by a certain horizontal distance. Two systems of conducting cross-well tomography are disclosed in U.S Pat. Nos. 5,142,500 and 5,406,530, the contents of which are hereby incorporated by reference herein.

U.S. Pat. No. 5,142,500 discloses a method of measuring the permeability, porosity and shear strength of a geological structure. This patent also discloses how the average permeability of beach sand between a source and a receiver can be measured acoustically by measuring the sound velocity and attenuation at multiple frequencies and comparing the data to the theoretical values of velocity and attenuation at the same frequencies, as calculated using the Biot theory, which is discussed in detail in Biot, M. A., "The theory of propagation of elastic waves in a fluid-saturated porous solid, II high frequency range," J. Acoust. Soc. Am., vol. 28, 179–191, 1956, the contents of which are incorporated by reference herein.

U.S. Pat. No. 5,406,530 discloses a non-destructive system of measuring the range, the accuracy, and the frequency resolution of acoustic cross-well tomography. It dramatically improves the measurement of these characteristics through the use of a pseudo-random binary sequence ("PRBS") method. The invention of PRBS has enabled users of the system to obtain accurate and long distance images of sound velocity and attenuation within sediments. However, while the PRBS method disclosed in U.S. Pat. No. 5,406,530 provides significant advantages in the accuracy of long distance imaging of sound velocity, it produces only the average permeability between a source and receiver by repeating acoustic transmission at multiple PRBS frequencies No spatial distribution or imaging of the permeability structure within the sediments was obtained from that invention, and sound velocity and attenuation still had to be measured at multiple frequencies.

The methods disclosed in the aforementioned patents provide significant advantages over the more conventional methods, such as pumping tests, which are very expensive and time-consuming, but only measure an average permeability of the layer between the wells. The methods disclosed in the aforementioned patents can be even further improved through the use of a cross-well tomography system which uses a single PRBS signal to create a spatial distribution at permeability throughout a geological structure.

OBJECTS OF THE INVENTION

Accordingly, it is an object of the present invention to provide a highly accurate non-destructive method of measuring physical characteristics of sediments and, particularly to obtain accurate cross-sectional spatial distributions of porosity and permeability values and variations, and to obtain accurate and clear measurement even when the method is practiced in a noisy environment.

It is another object of the invention to practice the method at great distances between cross wells, such as a mile or more.

It is still another object of the invention to provide such a novel and highly accurate non-destructive method of measurement at high frequencies not heretofore possible.

Further, is an object of the invention to obtain accurate evaluations of porosity and permeability through the use of limited acoustic frequencies.

Other important objects and advantages of the present invention will be apparent to those of skill in the art based upon the following disclosure, drawings, and claims.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIGS. 16(*a*) and 16(*b*) are tables illustrating permeability and porosity comparisons between the second preferred embodiment of the invention and pumping tests and density logs.

DESCRIPTION OF THE INVENTION

Figure 1:
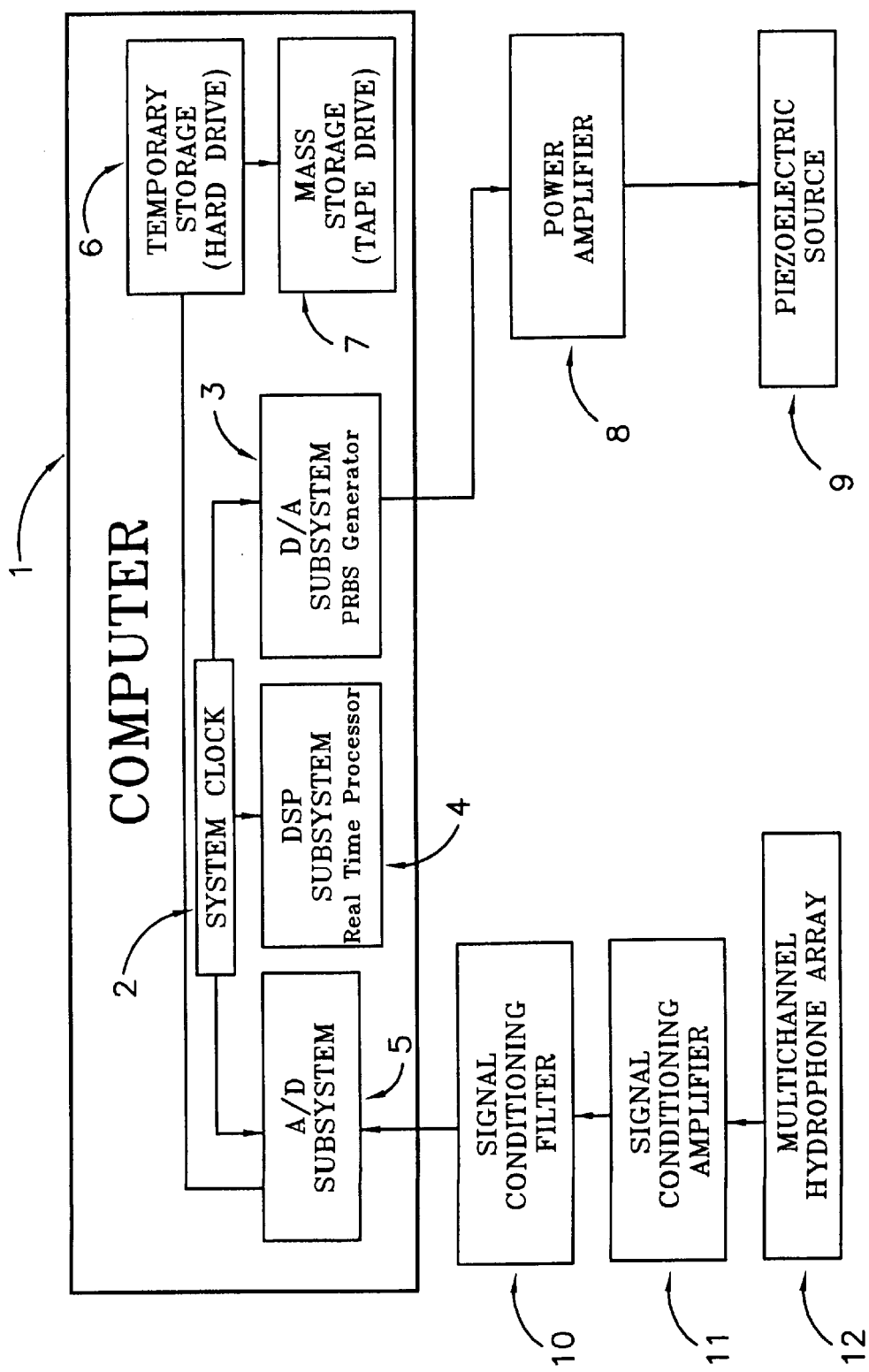
FIG. 1 is a schematic view illustrating a preferred embodiment of the invention.

It will be appreciated that the following description is intended to refer to the specific embodiments of the invention selected for illustration in the drawings and is not intended to define or limit the invention, other than as in the appended claims.

In accordance with the present invention, an image of the permeability structure within sediments is transformed from a pair of sound velocity and attenuation images within the sediments, which all are measured by cross-well tomography using only a single PRBS frequency.

This may be accomplished by electro-acoustically measuring a pair of sound velocity-attenuation images within the sediments and then transforming the velocity-attenuation image pair into a corresponding permeability-porosity image pair. This transformation procedure produces the permeability image from a measured velocity-attenuation image pair.

This can be accomplished by generating a PRBS signal of a desired frequency, transmitting it through a transducer into a medium to be measured, receiving the transmitted signal through one or more transducers, and averaging or cross correlating the received PRBS signals with the input PRBS signal in real-time. By monitoring the received PRBS signal in real-time, the system of the present invention is capable of controlling the quality of data at any desired level of signal-to-noise ratio. This ensures the accuracy of the velocity and attenuation images that are inverted from the set of time wave form data.

FIG. 1 illustrates a preferred embodiment of the invention utilizing a computer. Of course, the present invention is not limited to the use of a computer, but can incorporate any configuration of electrical and mechanical signal generating, receiving, and processing equipment capable of completing the image inversion in the manner of the present invention as described in more detail below.

As shown in FIG. 1, Computer 1 may include System Clock 2, which is connected in a conventional matter to PRBS Generator 3, Real-Time Processor 4 and A/D Subsystem 5. These components may be configured in any number of ways known to those of ordinary skill in the art, such as through use of integrated chip technology or discrete logic circuits.

A/D Subsystem 5 is connected in a conventional manner to Temporary Storage 6 which is in turn connected to Mass Storage 7. Temporary Storage 6 and Mass Storage 7 may comprise any number of conventional electromagnetic or electro-optical storage media, such as ferromagnetic disk drives, ferromagnetic tape systems, or read-writable CD-ROM technology.

PRBS Generator 3 is connected to Power Amplifier 8 which is in turn connected to Piezoelectric Source 9. A/D Subsystem 5 is connected to Signal Conditioning Filter 10 which is in turn connected to Signal Conditioning Amplifier 11 and Multi-Channel Hydrophone Array 12.

PRBS Generator 3 generates an electrical signal of a selected frequency which is transmitted to Power Amplifier 8 in a conventional matter. PRBS Generator 3 may comprise any number of fixed or variable oscillating sources known to those of ordinary skill the art, such as crystal oscillator and associated circuitry. The generation of the signal from PRBS Generator 3 is controlled by a Real-Time Processor 4 in a programmed manner. For example, Real-Time Processor 4 may contain computer programming code, stored in memory therein in a conventional manner, which sets forth the specific operational steps to be taken by a Computer 1 in selecting, generating and processing the transmitted and received signal in accordance with the present invention, as described in more detail below.

Piezoelectric Source 9 converts the electrical signal from PRBS Generator 3, which is amplified by Power Amplifier 8, into an acoustical signal which is transmitted outwardly into and through the medium to be measured.

The reflected acoustical signal from the medium is received by Multi-Channel Hydrophone Array 12, which converts this acoustical signal back to an electrical signal for processing. The received signal is passed through Signal Conditioning Amplifier 11 and Signal Condition Filter 10 and passed to A/D Subsystem 5. The received signal is then stored in Temporary Storage 6 and/or Mass Storage 7.

The received signal may then be processed by Real-Time Processor 4 and stored in a Temporary Storage 6 or Mass Storage 7 in accordance with the system of the present invention.

Figure 2:
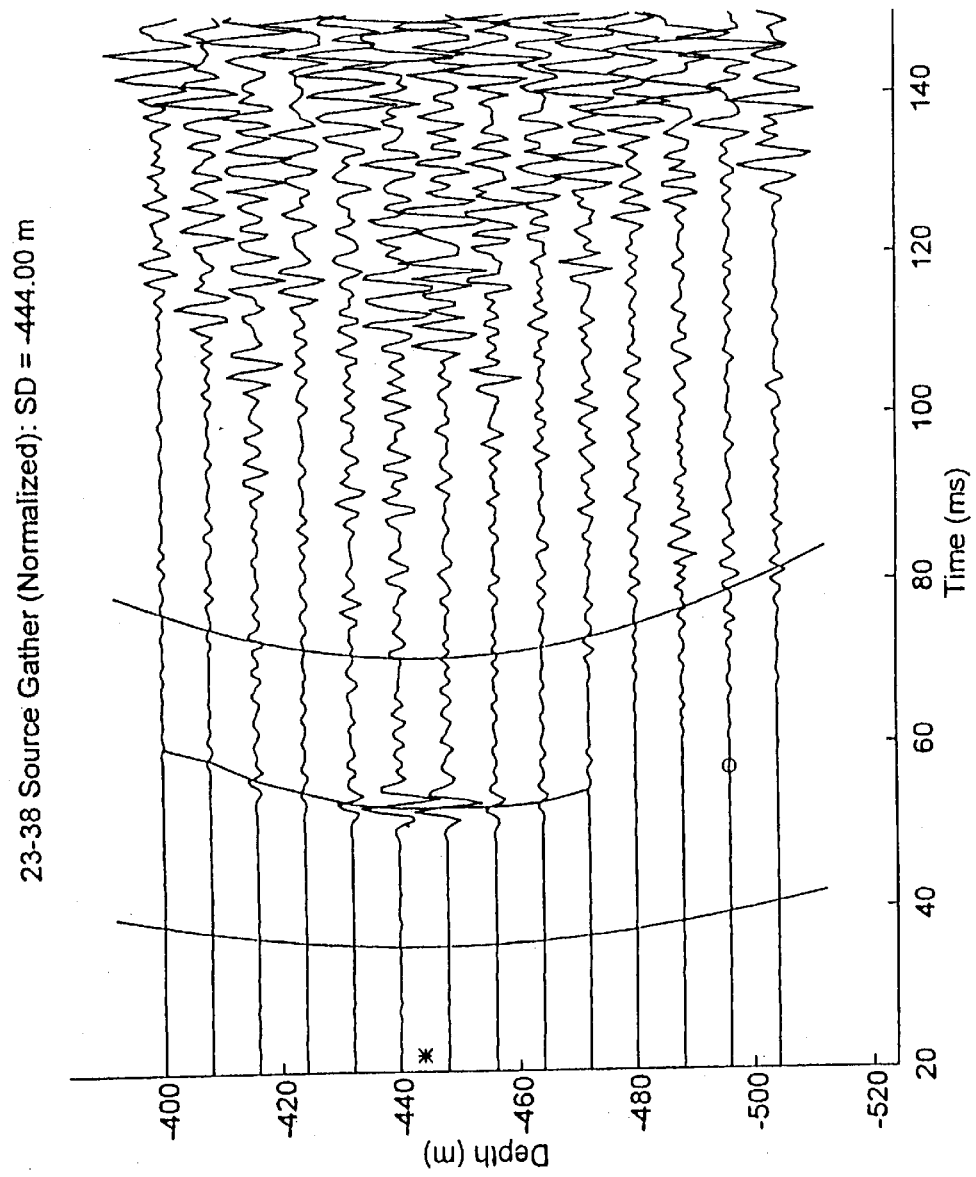
FIG. 2 is a graph of data obtained by the preferred embodiment of the invention.

An example of real data as received by Multi-Channel Hydrophone Array 12 is shown in FIG. 2. In this example, the cross-well distance was 107 m. The real-time quality control achieved by the present invention is necessary for accurately imaging the permeability structure as well as imaging the fluid contents of pores within the sediments of the medium being measured.

The received signal data sent to Real-Time Processor 4 from A/D Subsystem 5 is processed in accordance with a new inversion theory which explicitly converts a pair of sound velocity and attenuation images derived from the transmission and reception of a series of acoustical signals into a pair of permeability and porosity images. This inversion theory is discussed in detail in Yamamoto, T., "Acoustic propagation in the ocean with a poro-elastic bottom," J. Acoust. Soc. Am., 73(5), 73(5), 1587–1596, the contents of which are incorporated by reference herein.

Universal Sediment Model

A sound theoretical model or an empirical model of elastic wave propagation through the sediments is necessary for calculating the permeability inversion. Particularly, because of the large variability in the geothermal and geophysical properties of limestone, there has been no sound theoretical or empirical model of elastic wave propagation in limestone.

The limestone model used in accordance with the present invention is based upon the Biot theory of poroelasticity, the squirt flow mechanism in porous frame disclosed in Dvorkin, J, and Nur, A., "Dynamic porelasticity: A unified model with the squirt and the Biot mechanism," Geophysics, 58, 524–532, 1993, the contents of which are hereby incorporated by reference herein, and an elastic theory of limestone based on the laboratory ultrasonic measurements of compressional and shear waves through numerous limestone samples disclosed in Anselmetti, F. S., Salis, G. A. von, Cunningham, K. J., and Eberli, G. P., "Acoustic Properties of Neogene carbonates and siliciclastics from the Subsurface of the Florida Keys: Implications for Seismic Reflectivity," Marine Geology Vol. 144 (1997), pp. 9–31.

According to the Biot theory, discussed in Biot, M. A., "The theory of propagation of elastic waves in a fluid-saturated porous solid, II high frequency range," J. Acoust. Soc. Am., vol. 28, 168–178, 1956a, the contents of which are incorporated by reference herein, two kinds of compressional waves can propagated through a fluid filled porous medium. One is in the usual sound wave and the other is a diffuse wave which is seldom observed because of its high attenuation. The velocity, attenuation, and intrinsic attenuation of these waves and their interaction is represented mathematically by Biot.

In practice, only the compressional waves (the sound waves) are of interest. The Biot theory has been shown to be a good model for unlithified sediments. However, for lithified sediments, such as sandstone and limestone, the theory has not been shown insufficient because squirt flow takes place in the frames of lithified sediments in addition to the Biot mechanisms.

Squirt flow is a flow of fluid which is squeezed in and out of small gaps between sediment grains in the vicinity of contact points as the grains are pushed together or pulled away from each other as a result of propagation of the compression waves. The effects of the squirt flow mechanism has been accommodated in the Biot mechanism.

Biot's theory can be used to create a universal geoacoustic model for various types of materials, such as sandstone and limestone. The universal geoacoustic model can model all kinds of sediments.

In this model, the input sediment properties are:

$K_s$=bulk modulus of solid phase,
$K_f$=bulk modulus of pore-fluid,
K=bulk modulus of sediment frame in dry condition,
N=shear modulus of sediment frame,
$\rho_s$=density of solid frame,
$\rho_f$=density of pore-fluid,
$c_a$=added mass coefficient of frame,
$\mu$=viscosity of pore-fluid,
k=permeability,
$\phi$=porosity,
$C_h$=squirt flow length to pore size ratio.

The frame elastic moduli K and N are functions of porosity and the in site effective stress. The values of model parameters are difficult to estimate theoretically. Therefore, empirical relations are found from laboratory ultrasonic measurements on core samples. Compressional wave velocity and shear wave velocity are measured on many rock samples from laboratory ultrasonic tests as functions of porosity and other parameters.

Then the elastic moduli are extracted by comparing the ultrasonic data with rock models.

The empirical relation between the shear modulus N, porosity $\phi$, and the effective confining stress $\delta$ is given as:

$$N=1.835e+5\{(1-\phi)\}^{1.12}\delta^{1/2}, \{\text{units in Pa}\}.$$

The confining effective stress at a given depth of burial z in the sediment strata under normal consolidation is given as:

$$\delta = g \int \theta_0^z ((1+2\chi)/3)(\rho_x - \rho_f)(1-\phi) \, dz,$$

where g is the acceleration of gravity and $\chi$ is the coefficient of earth pressure at rest and related to the internal friction angle $\theta_0$ by $\chi=1-\sin \theta_0$. Since $\theta_0$ in natural sediments is about 30°, $\chi$ is about 0.5.

The bulk modulus K of frame may be reasonably estimated from the shear modulus N and the Poisson ratio of frame $\upsilon$ as:

$$K=N(2+2\upsilon)/(3-6\upsilon).$$

If there is no available data for $\upsilon$, one may assume $\upsilon=0.3$. A resulting small error in K is not very critical in velocity calculations because the bulk modulus of a frame of an uncemented sediment K is usually much smaller than $K_f$ and $K_s$.

Vp and Vs are given as:

$$V_p=A_0-A_j\phi-A_3c, \quad V_s=B_0-B_j\phi-B_2c$$

where c is the clay content and $A_j$, and $B_j$ (j=0, 1, 2) are empirical constants. These empirical constants are given for confining stresses of 50, 100, 200, 300 and 400 bars. These constants are only slightly affected by the confining stress. For a confining stress of 100 bars, they are:

$$A_0=5.39, A_j=2.02; B_0=3.29, B_j=4.73, B_2=1.74 \text{ [km/s]}.$$

The median of c for the 75 samples is 0.10. Therefore, if no data is available for c, one may assume c=0.10 for velocity calculations.

Our model elastic coefficients are given as follows. The shear modulus is given by:

$$N=\rho V_s^2$$

where $\rho$ is bulk density of sediment given by:

$$\rho=(1-\phi)\rho_s+\phi\rho_f.$$

Note that $N_s$ is given by N for $\phi=0$. For c=0.1, $N_s=2.57e10$Pa. Likewise, $K_s$ for c=0.1, is given by:

$$Ks=\rho_s V_p^2-4N_s/3=2650\times(5.39-0.1\times2.02)^2-1.333\times2.57e10=3.71e10\text{Pa}.$$

The bulk modulus of frame K is given from the relation of dry sample test and wet sample test as:

$$K=N[(V_p/V_s)-U]^2,$$

where U is the difference between the wet velocity ratio and the dry velocity ratio, and is given as:

$$U=0.018+0.3\phi+0.47c.$$

For the median clay content c=0.1, U=0.065.

The elastic constants of limestone are much less known as compared to sandstone. Only very recently, some $V_p$ and $V_s$ data from ultrasonic measurements have been made. The effect of burial depth or confining stress on the elastic constants of limestone is negligible as compared to that of sandstone. On the other hand, the pore geometry and frame chemical composition are very widely varied in limestone as compared to sandstone. By fitting the limestone BISQ model to ultrasonic compression and shear wave velocity data, the following semi-empirical equations for limestone frame moduli are derived.

The shear modulus of the frame is given by:

$$N = N_s(1-\phi)^n$$

where $N_s$ is the shear modulus of the solid phase, and is 3.86e10Pa for calcite and 5.12e10Pa for dolomite. The porosity power law exponent "n" may also vary. For the data set used, n=3.80. The frame bulk modulus does not follow the power law. Instead, we found that the Poisson's ratio of the frame is constant, $\upsilon$=0.286. Thus, the bulk modulus K of the limestone frame is given by:

$$K = N(2+2\upsilon)/(3-6\upsilon) = 2.07\, N.$$

When used as a forward model, one can first select uncemented sediments, sandstone, or limestone. For any of these three cases a set of six index physical constants [$K_s$, $K_f$, $\rho_s$, $\rho_f$, ca, $\mu$]; frame elasticity parameters: [v, x, z] for uncemented sediments, [$A_j$, $B_j$ (j=0,1,2), c, $C_h$] for sandstone, or [$N_s$, v, n] for limestone; pore properties [k, $\phi$, $C_h$]; and frequency had to be given as a model parameters. Except for pore properties k and $\phi$, all of the other model parameters are physical constants. For the given set of model parameters, the forward model calculates the velocity and attenuation of the compressional and shear waves [$V_p$, $V_s$, $1/Q_p$, $1/Q_s$].

Because the shear wave attenuates much more than the compressional wave at a given frequency, only the compressional wave is recognizable in the recorded seismograms. Therefore, only the velocity and attenuation of the compressional wave is used in the permeability imaging and is simply expressed by V and 1/Q.

When the universal geoacoustic model is used as an inversion model for a given set of measured data (such as compression wave velocity, attenuation, and wave frequency [V, 1/Q, f]), solutions of the model for a given set of data yields a pair of permeability and porosity results [k, $\phi$]. These results usually comprise two, sometimes more, possible solution pairs [$k_1$, $\phi_1$] and [$k_2$, $\phi_2$], where $k_1 < k_2$ and $\phi_1 < \phi_2$.

Thus, for a given pair of measured velocity and attenuation images, the model finds two possible solution pairs of permeability and porosity images. The correct pair of permeability-porosity images can be easily determined by a determination test in which the two permeability-porosity pairs are measured at two or more different frequencies from the repeated transmission of the PRBS signal at selected depths. Moreover, the correct permeability-porosity image solution pair can be selected through experienced practice or a priori information, such as bore hole porosity logs, permeability data from a sample core, or even from the average permeability at a given depth interval determined by conventional pumping testing.

In another embodiment of the present invention, an exact solution formula based upon the numerical model discussed above may be utilized to develop the permeability and porosity images of the sediment being tested. This solution, known as the "super-k model" is a special case of the Biot model when the pore fluid bears no elastic restoring force when excited by acoustic waves. The super-k model gives the permeability and porosity images as the inverses of the acoustic velocity and attenuation at a given frequency in a closed analytical form.

The analytical super-k model allows for exact calculation of the direct calculation of a measured pair of velocity and attenuation results at a given frequency. Two pairs of permeability and velocity images are transformed from a pair of acoustic velocity and attenuation images measured at a single frequency. The correct pair of permeability-porosity images can then be determined by measuring the velocity and attenuation at a second or more frequency.

A study of the Biot mechanism and squirt flow reveals that there is a solution regime where only the Biot mechanism dominates over the squirt flow mechanism, where the stiffness of the pore fluid F is negligibly small as compared to stiffness of the skeletal frame K. This condition arises when the permeability of a porous rock is extremely high—such as that in South Florida limestone formations which have permeability of the order of 10 to 100 darcies. In this case (k tends to $\infty$), the stiffness of the pore fluid $F_{sq}$ tends to 0.

Physically, this means that the permeability is so high that the skeletal frame of the rock is always relaxed through squirt flow. The characteristic equation of the super-k model solution is obtained after substitution of the following equation:

$$u = U\, \exp[1(jx+\omega t)] \text{ and } w = W \exp\{i(jx-\omega t)\}$$

Into the following derived density equations:

$$\rho_1\, u_u + \rho_2 w_u = M u_{xx} - \alpha p_x$$

and $$\rho_2\, w_u - \rho_a(u_u - w_u) - (\mu\phi^2/k)(u_t - w_t) = -\phi P_x$$

where $\rho_1 = (1-\phi)\rho_s$; $\rho_2 = \rho_f$; $\rho_a = c_a(1-\phi)\rho_f$; t and x represent $\partial/\partial t$ and $\partial a/\partial x$, p is the pore pressure; and M is a Biot elastic coefficient for the porous rock.

The incremental pore pressure is always zero, p=0. The dispersion relation of the super-k model is then given as:

$$S^2 = \frac{(\rho_1 \rho_2 = \rho_a \rho) + i\rho\rho_f \Phi}{M(\rho 2 + \rho_a + i\rho_f \Phi)}$$

where the dimensionless frequency-permeability parameter $\Phi$ is given as:

$$\Phi = \frac{\mu \phi^2}{\rho_{fk}\omega} = \frac{\omega_0}{\omega}$$

The super-k model can then be solved for a direct and analytical inverse solution for the permeability for a given acoustic data. First, the porosity inverse is calculated from the real part of the above equation. The density factors $\rho_1$, $\rho_2$, $\rho$ and $\rho_a$ are functions only of porosity $\phi$ with a constant value of added mass coefficient $C_a$. Then the permeability inverse is given through the imaginary part of the equation. For a given attenuation $Q^{-1}$ measured at a given frequency, two possible values of permeability are given by the two roots of the following parabolic equation of the dimensionless frequency-permeability parameter $\Phi$:

$$\Phi^2 - \rho_2{}^2/(\rho\rho_f Q^{-1})\Phi + (\rho_2 + \rho_a)(\rho_1\rho_2 + \rho_a\rho)/(\rho_f{}^2 \rho) = 0$$

The correct inverse is found by repeating the inversion for $Q^{-1}$ measured at one or more different frequencies. The correct inverse is found as an invariant which is independent of frequency. Then, the correct permeability is found through the parabolic equation.

FIG. 16(a) compares the values of permeability and porosity inverted from each of the acoustic data of 2, 4, 8, and 12 kHz for a limestone formation at depth 1154 feet through the super-k inversion equation above. At the bottom of the table, the mean and the standard deviation of the two sets of permeability and porosity pairs are given. As can been seen, the first permeability-porosity pairs inverted from the four different frequencies are independent of the frequency within the range of experimental error having very small standard deviations, indicating that this pair is the correct answer; permeability k=97.8 darcies and porosity of 0.448.

The second permeability-porosity pair changes greatly with the frequency, indicating that this pair is not the correct answer. The acoustically inverted permeability agrees excellently with the permeability value of 89.0 darcies measured from the pumping test by SFWMD (1997).

The acoustically inverted permeability and porosity for the limestone formation at 1514 are given in FIG. 16(b). This formation is found to have a smaller permeability and porosity; 34.5 darcies and 0.347, respectively, from the acoustic inversion. These values also agree excellently with the SFWMD pumping test permeability of 33.2 darcies and the downhole log porosity of 0.39.

PRBS Cross-Well Tomography Test

Figure 3:
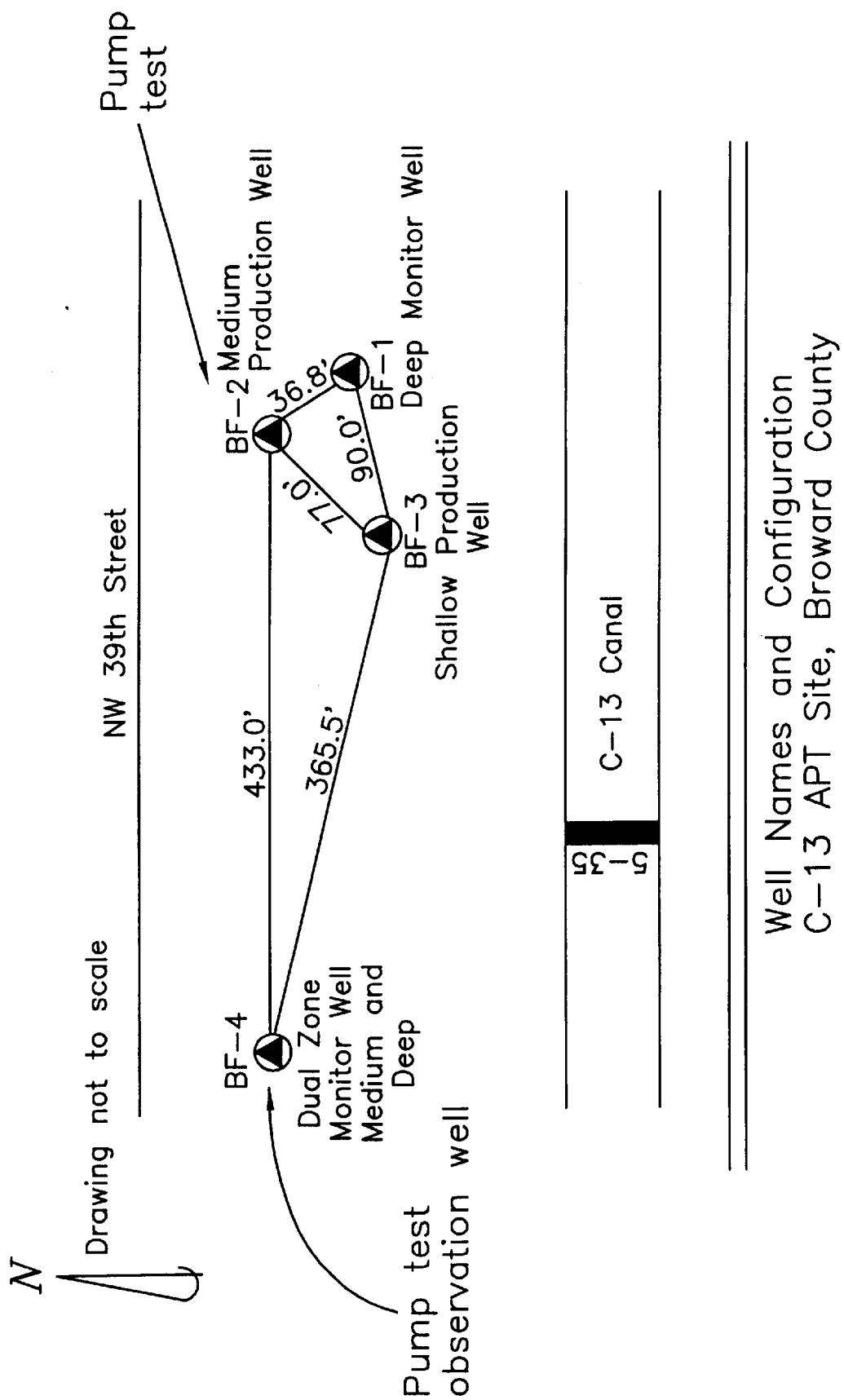
FIG. 3 is a geographic map showing the location of the PRBS Cross-Well Tomography Test site for testing of the present invention.

The method of the present invention and the significant advantages achieved thereby can be better understood through the description of actual test results using the system of the present invention. Such a test was conducted during the period between Mar. 3–12, 1997 using wells BF-1 and BF-2 of the South Florida Water Management District (SFWMD) in Fort Lauderdale, Florida. The exact locations of the wells used in the test are shown in FIG. 3.

The test wells were separated by 37 feet. Both wells were steel cased. Core tests were performed prior to the casing, yielding some porosity information. In addition, pumping tests were performed by the SFWMD across wells BF-2 and BF-4, which were separated by 433 feet. These produced average permeability values at two depth intervals.

Packer tests were also performed in well BF-1 by SFWMD which produced average permeability values and two more depth intervals within the levels used in the PRBS Cross-Well Tomography Test, which were compared with the acoustically imaged permeability obtained with the system of the present invention.

The PRBS Cross-Well Tomography Test was conducted across wells BF-1 and BF-2. An acoustic source ITC Model No. 6121 was placed in well BF-2 while an 8-channel hydrophone array with a constant inter-element distance of 24 feet was placed in well BF-1. A 40 foot high standpoint was placed at the source wellhead to keep water from rushing out of the artesian well. Wellhead pulleys were placed at both wells to change the elevation of the source and the hydrophones. The deepest source depth was at 1600 feet, where the steel casing ended in well BF-2. Above the depth of 1600 feet, both the source and the centroid of the hydrophone array were moved every 1.5 feet up to the depth of 1500 feet and then every 6 feet up to the depth of 1000 feet.

Figure 4:
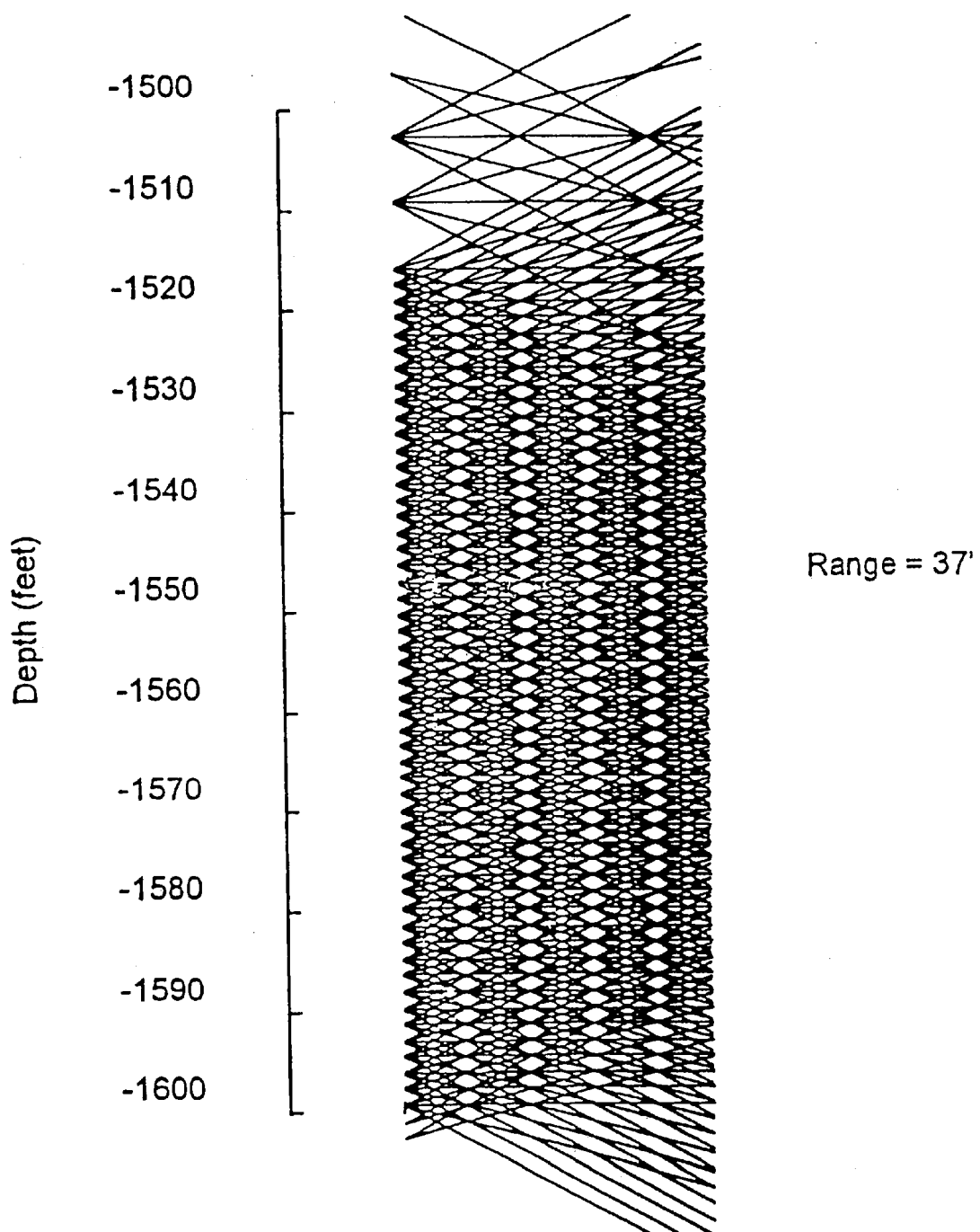
FIG. 4 is a graph showing the ray paths and inversion calculations used in the PRBS Cross-Well Tomography Test of the present invention.
Figure 5:
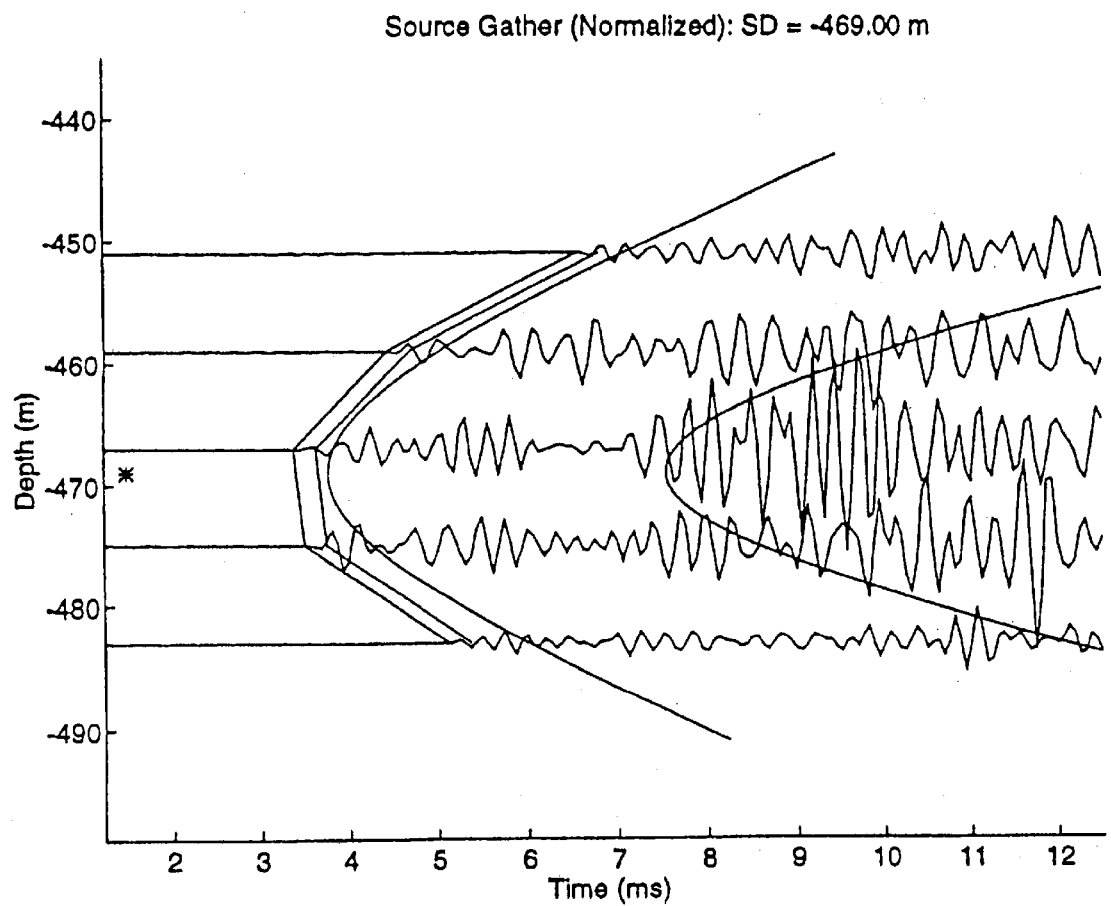
FIG. 5 is a graph showing the wave field measured by the hydrophone array used in the PRBS Cross-Well Tomography Test of the present invention.
Figure 6A:
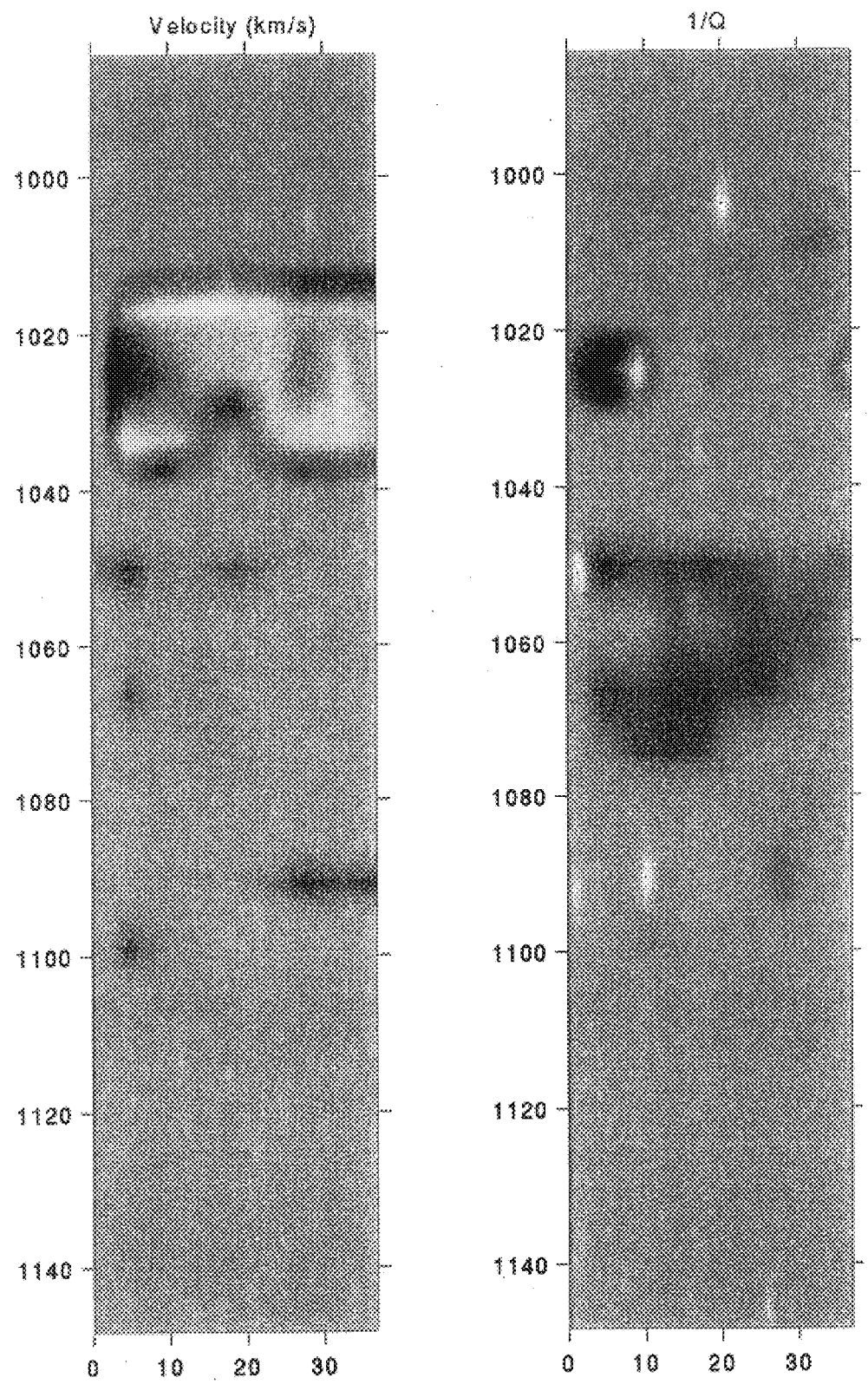
FIGS. 6(a)–(i) are a series of graphs showing the velocity and attenuation images of the PRBS Cross-Well Tomography Test of the present invention.
Figure 6B:
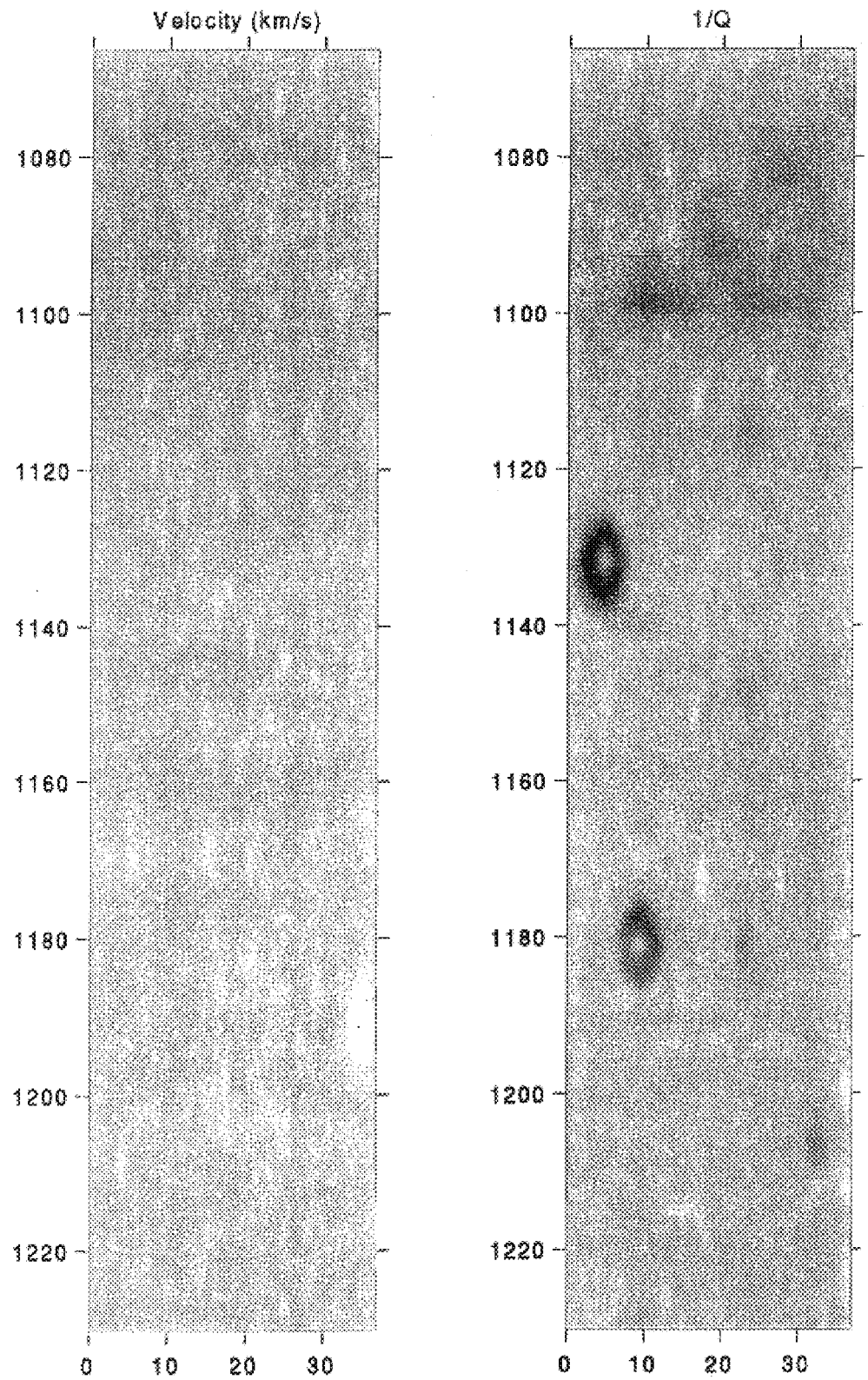
Figure 6C:
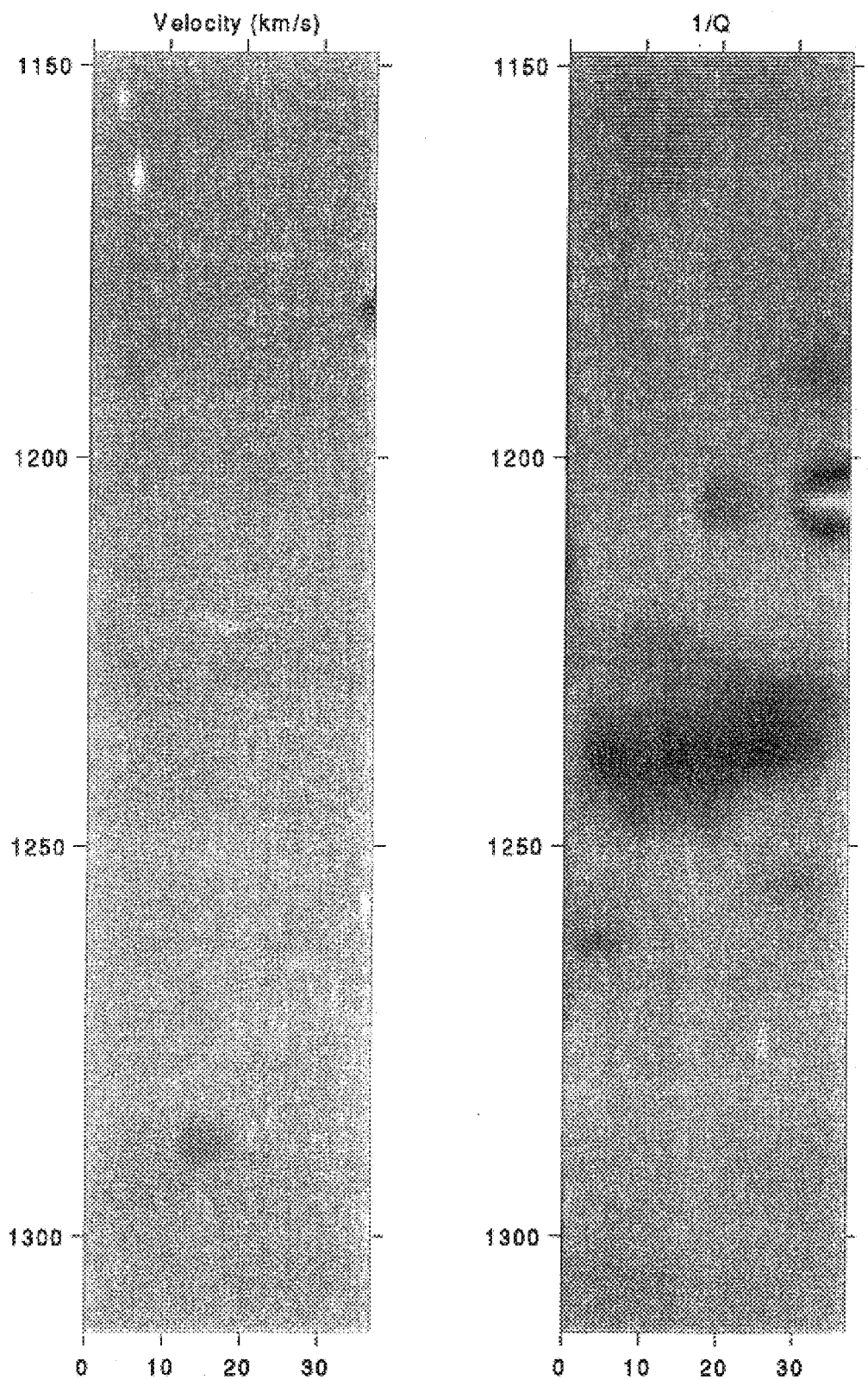
Figure 6D:
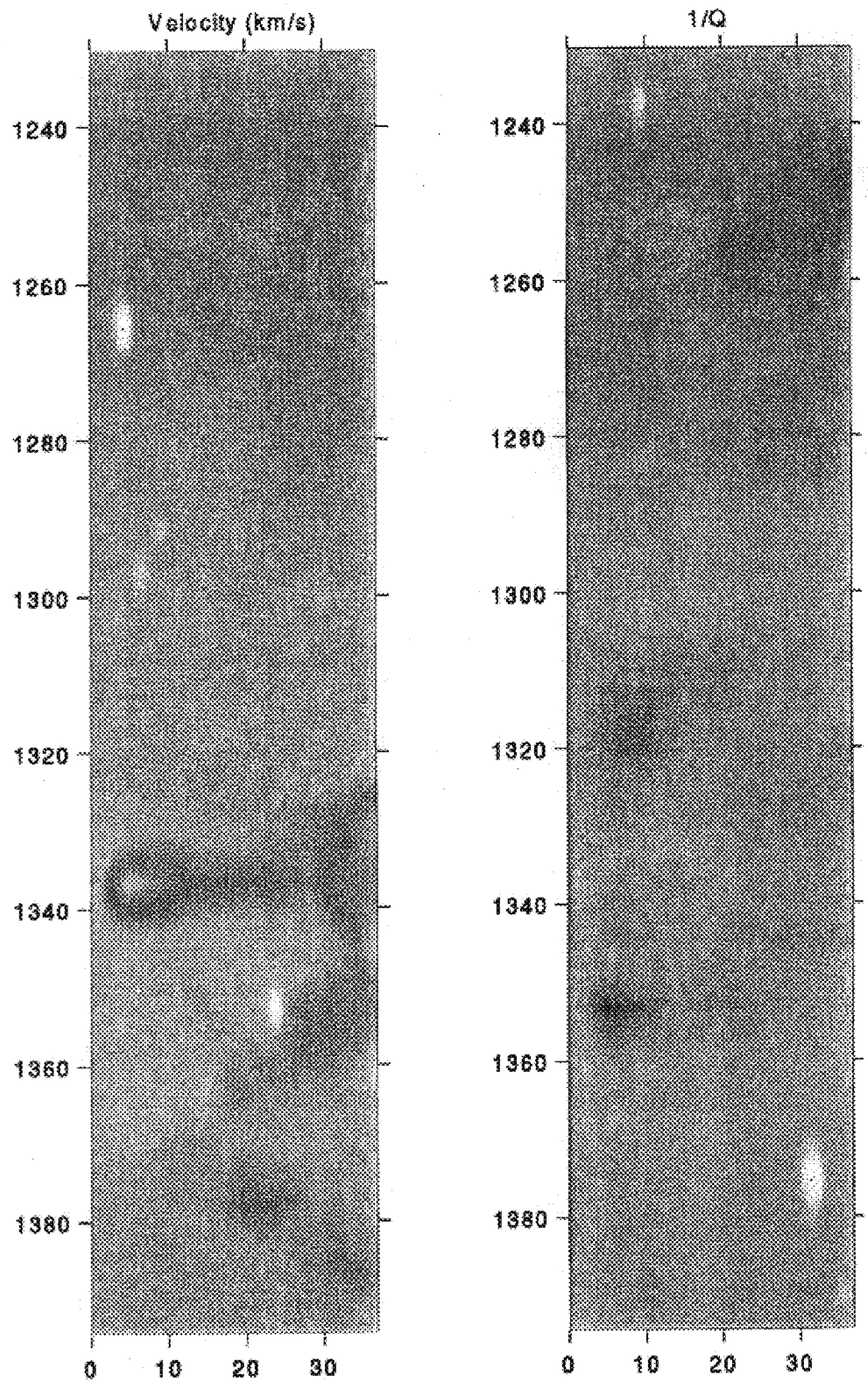
Figure 6E:
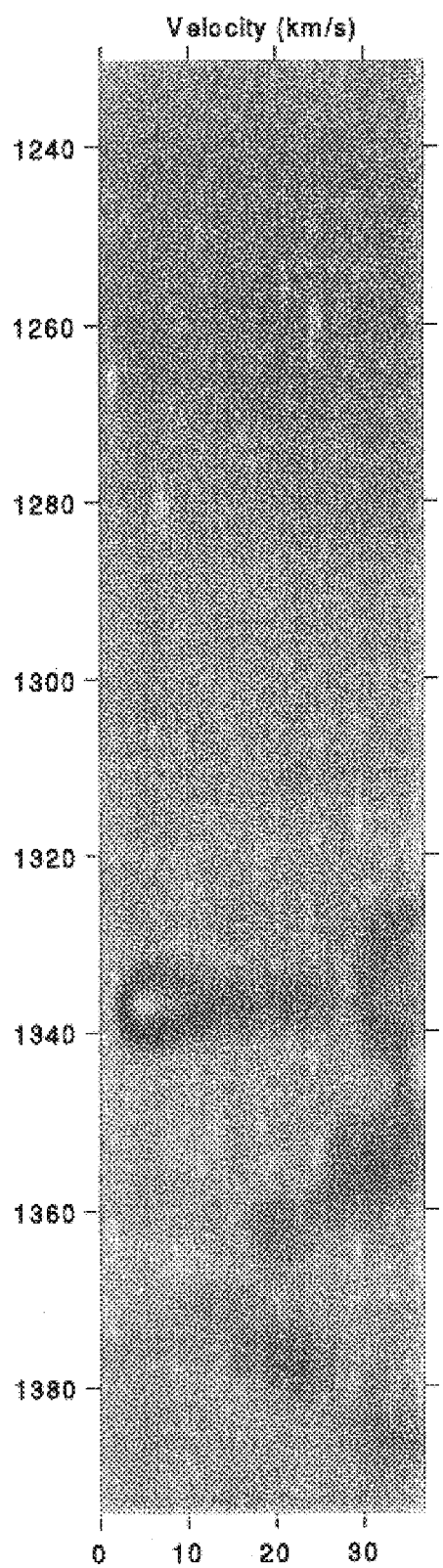
Figure 6E:
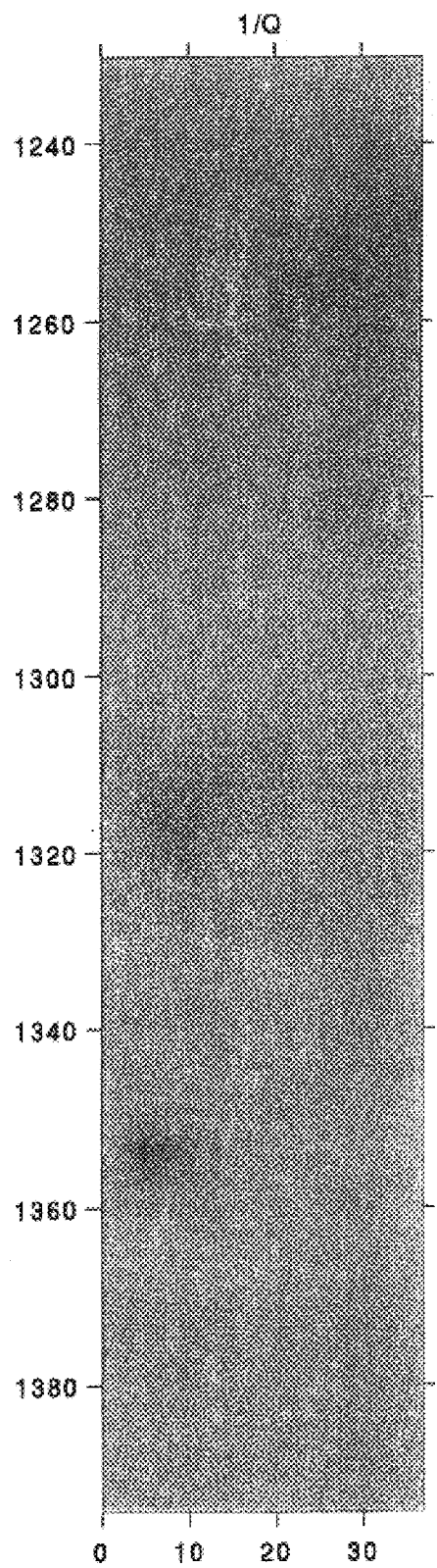
Figure 6F:
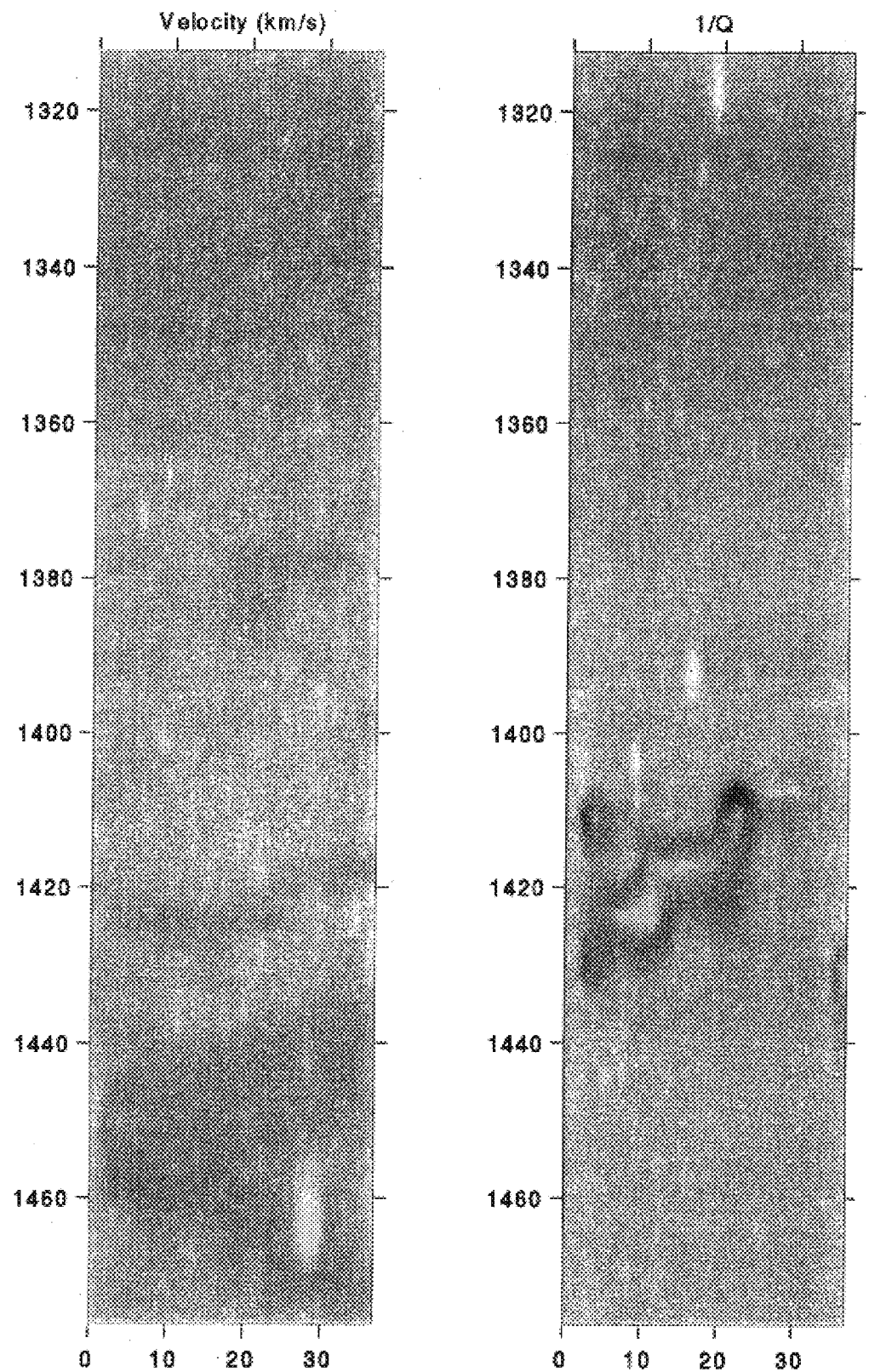
Figure 6G:
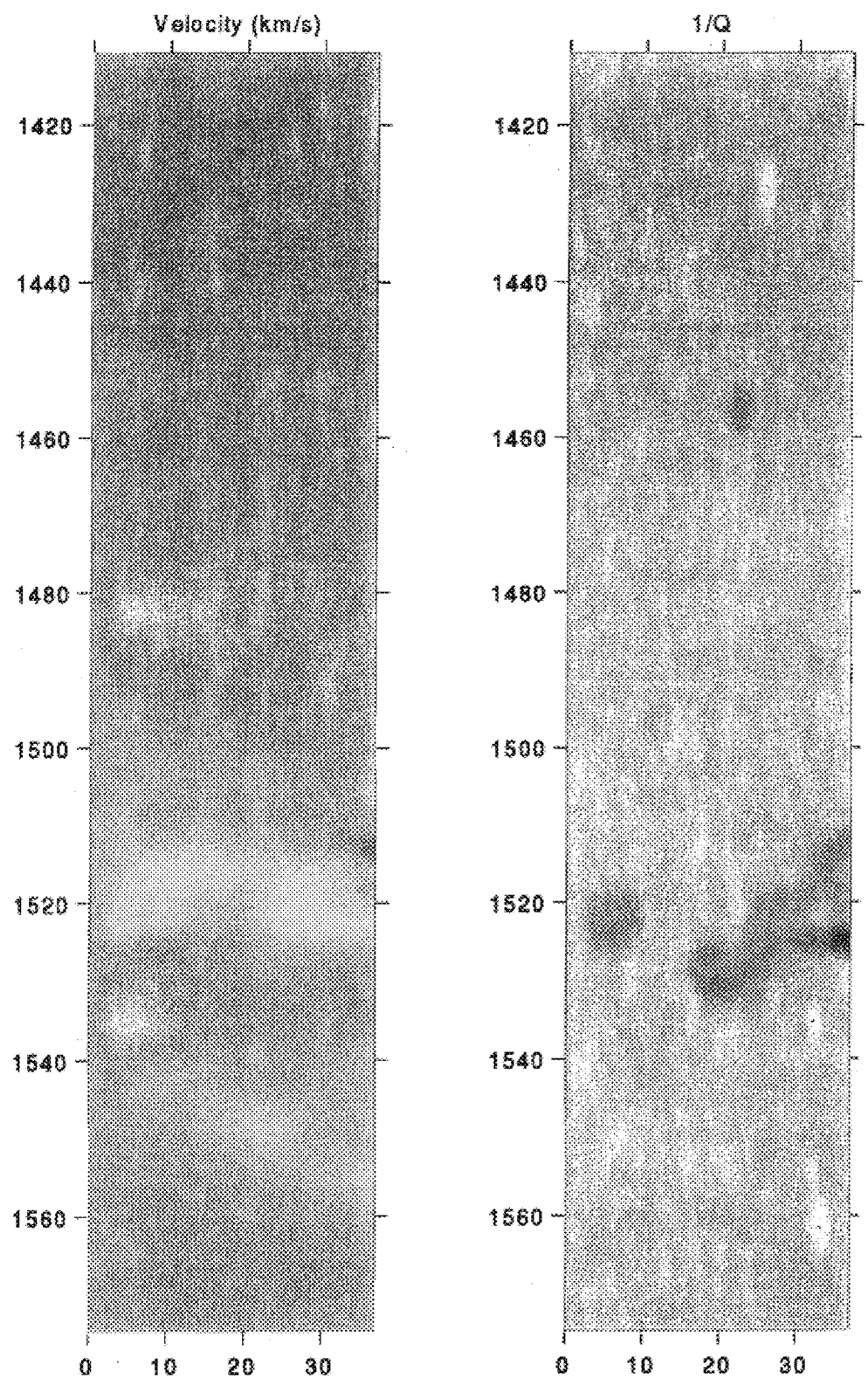
Figure 6H:
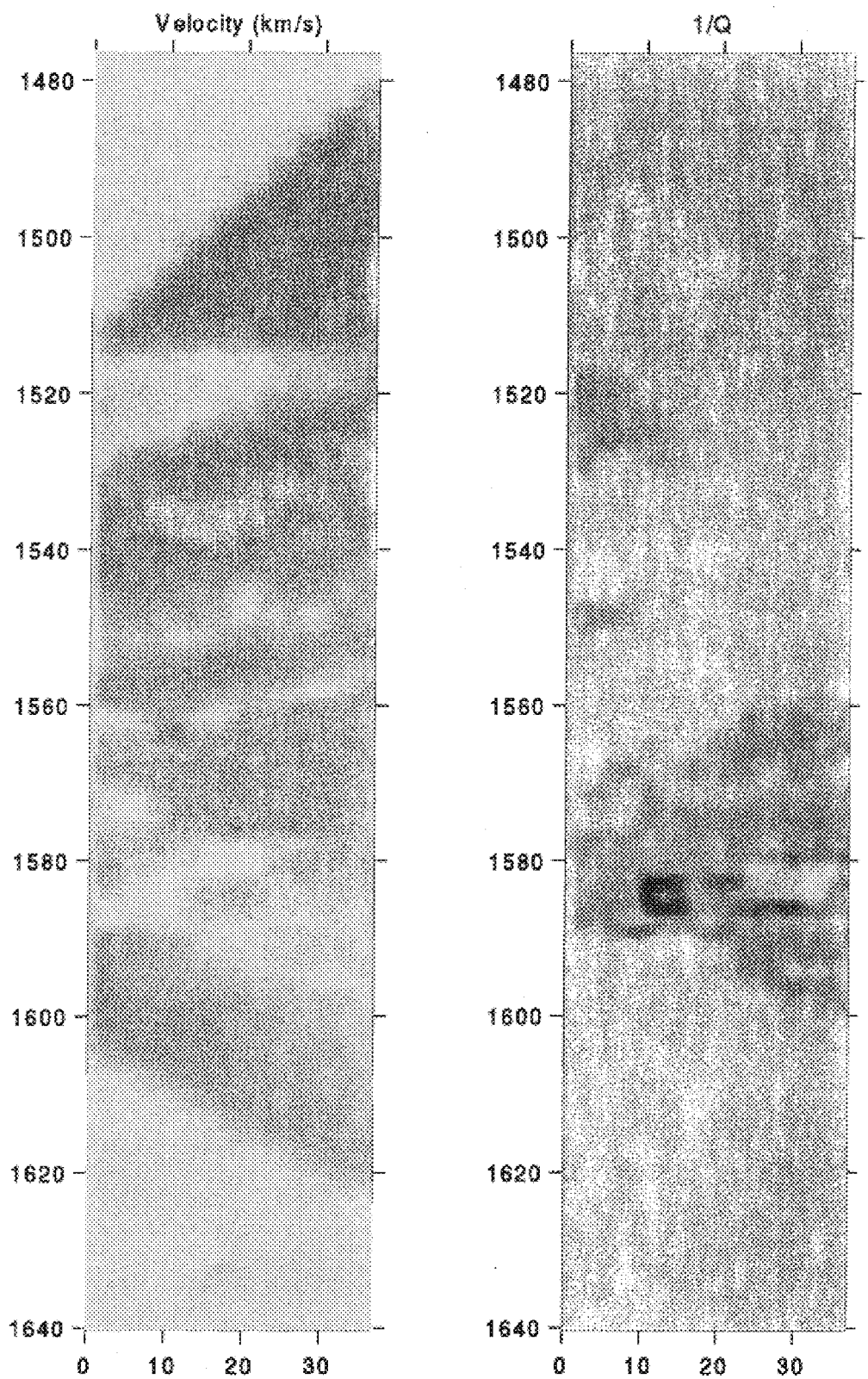
Figure 6I:
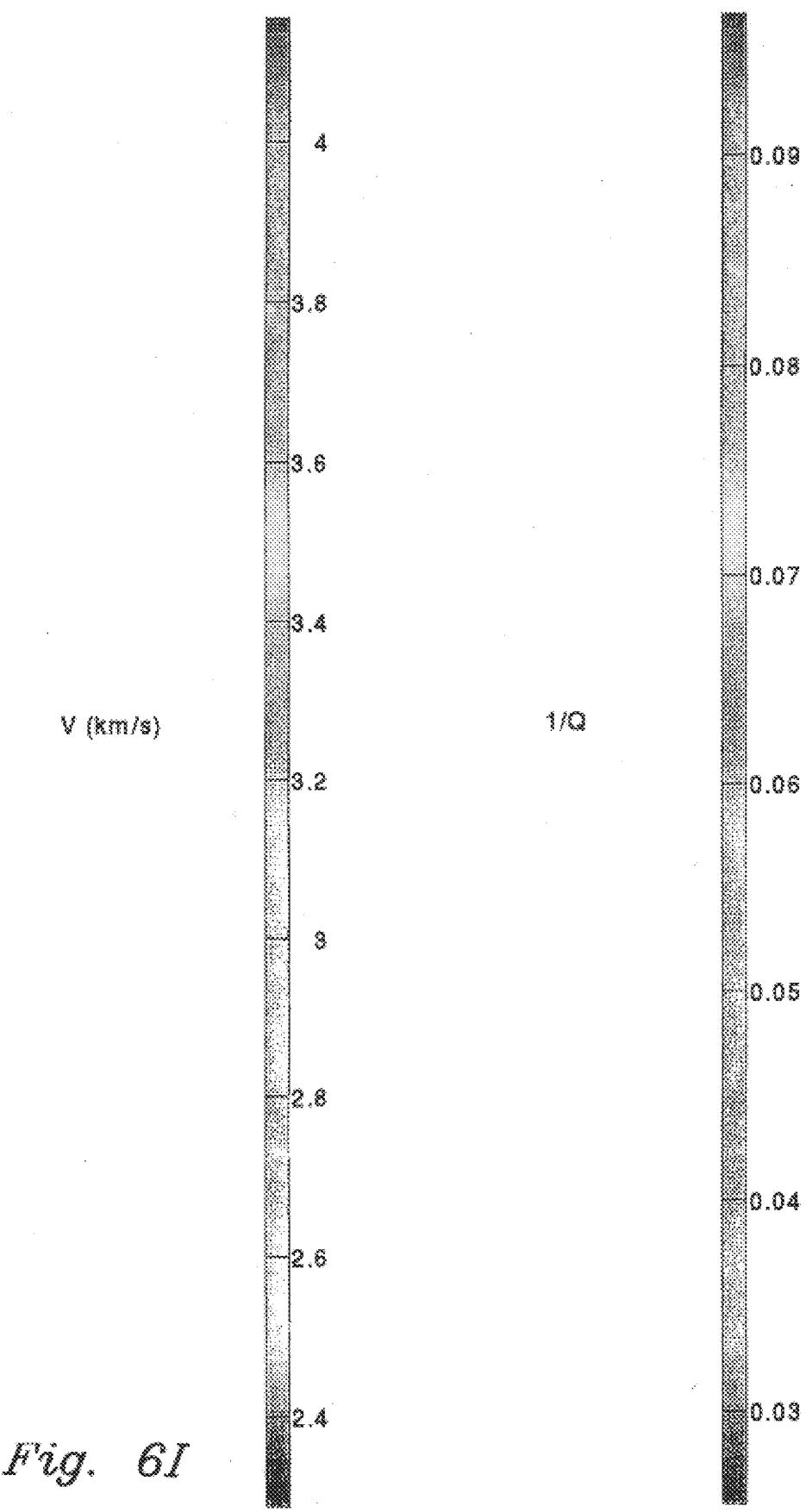
Figure 7A:
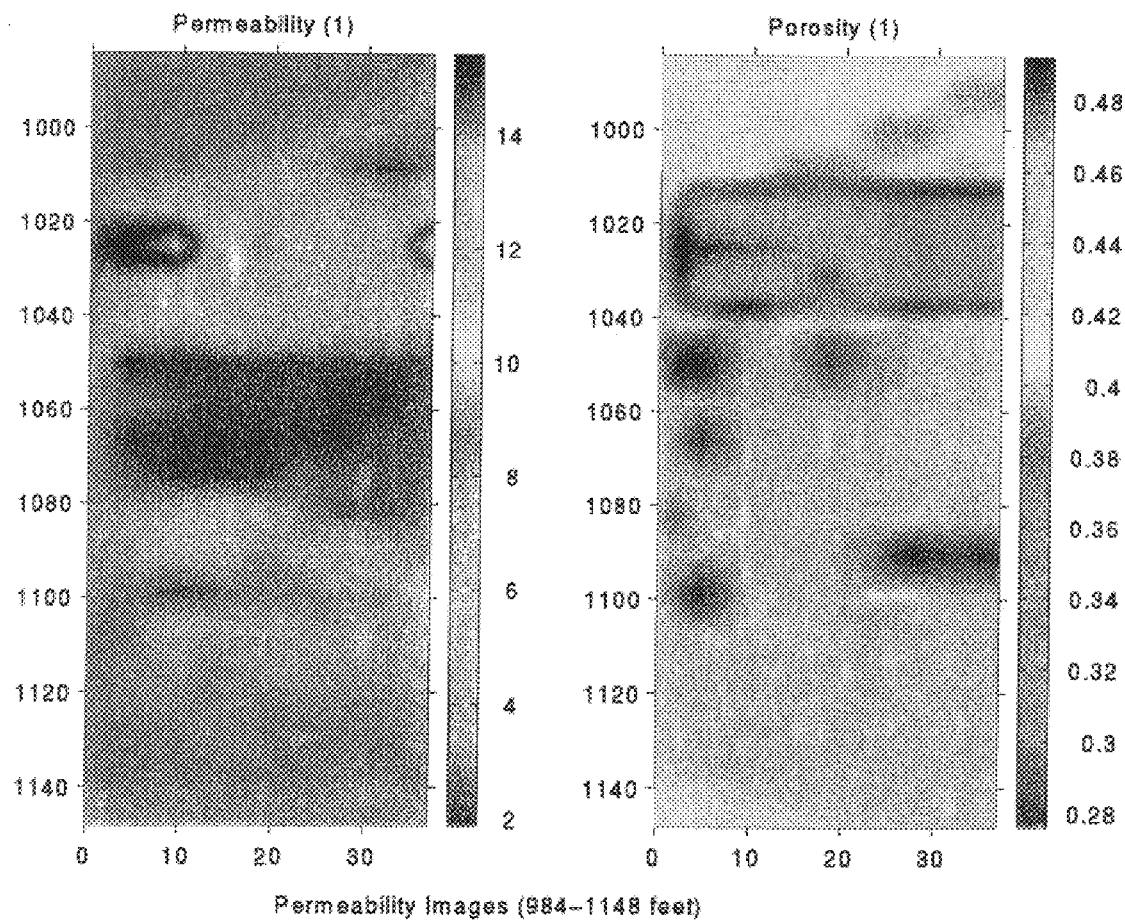
FIGS. 7(a)–(f) are graphs showing the first solution pair of the PRBS Cross-Well Tomography Test of the present invention.
Figure 7B:
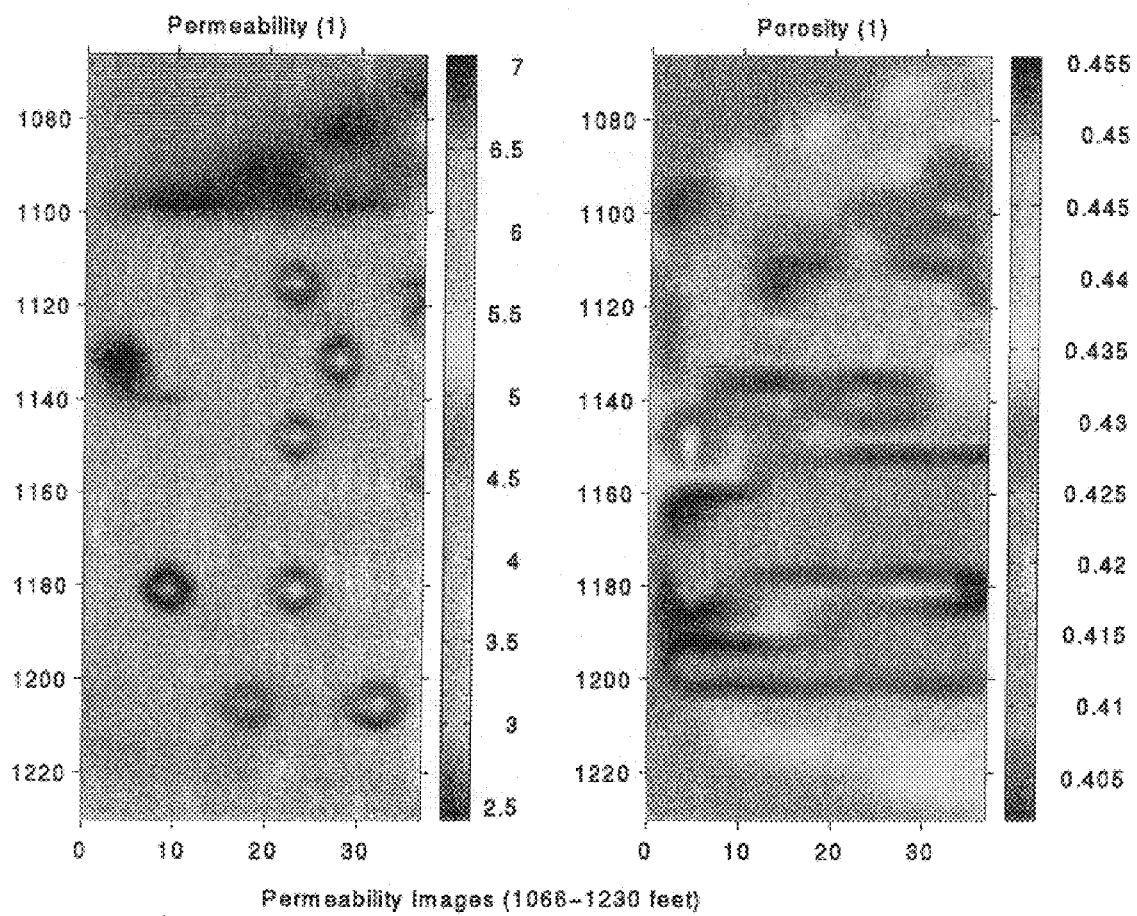
Figure 7C:
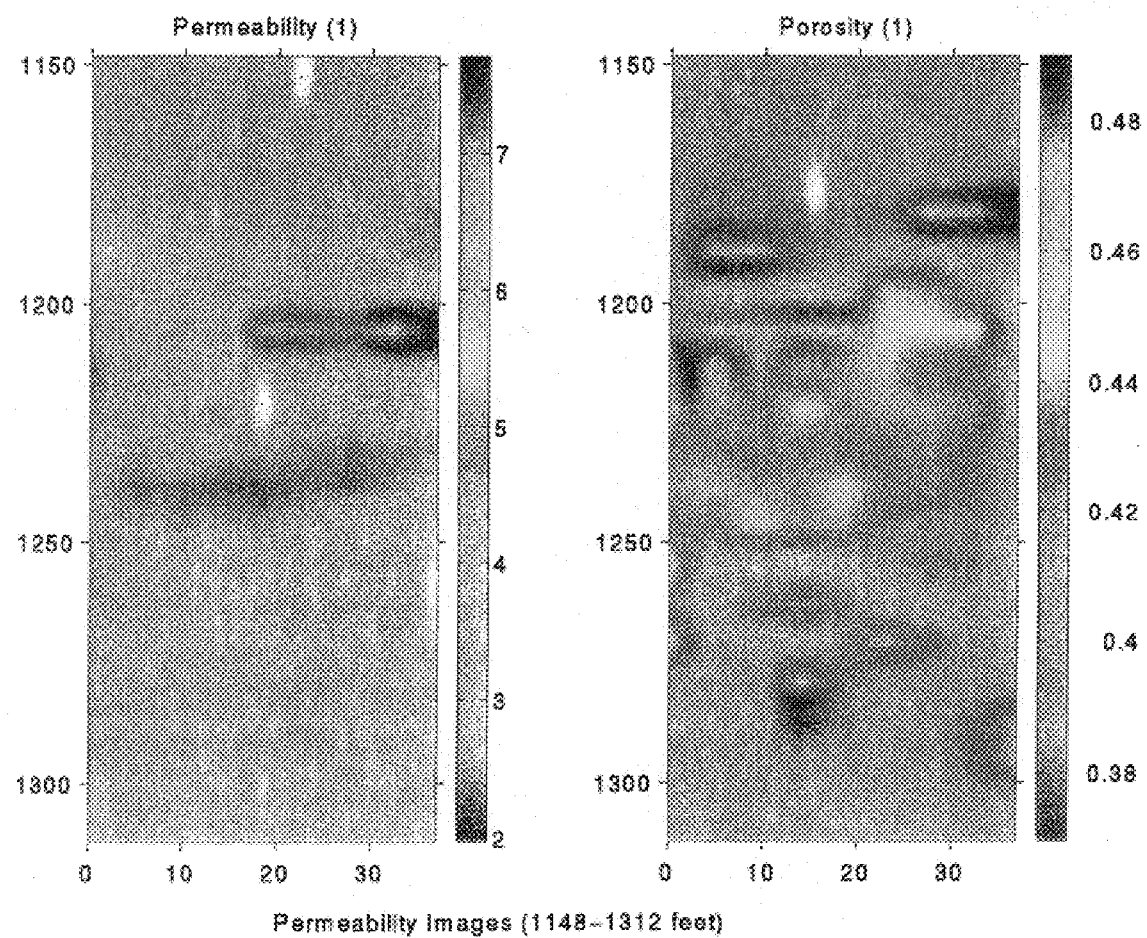
Figure 7D:
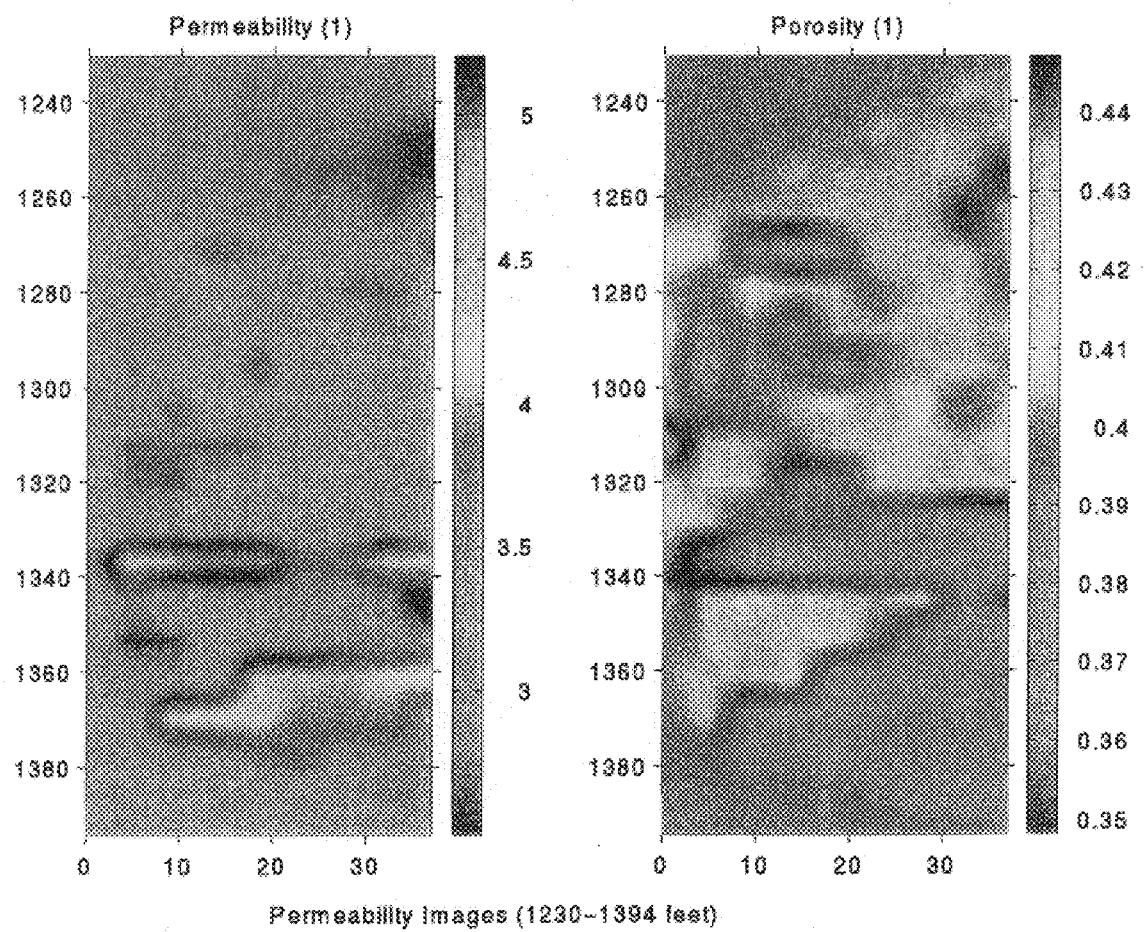
Figure 7E:
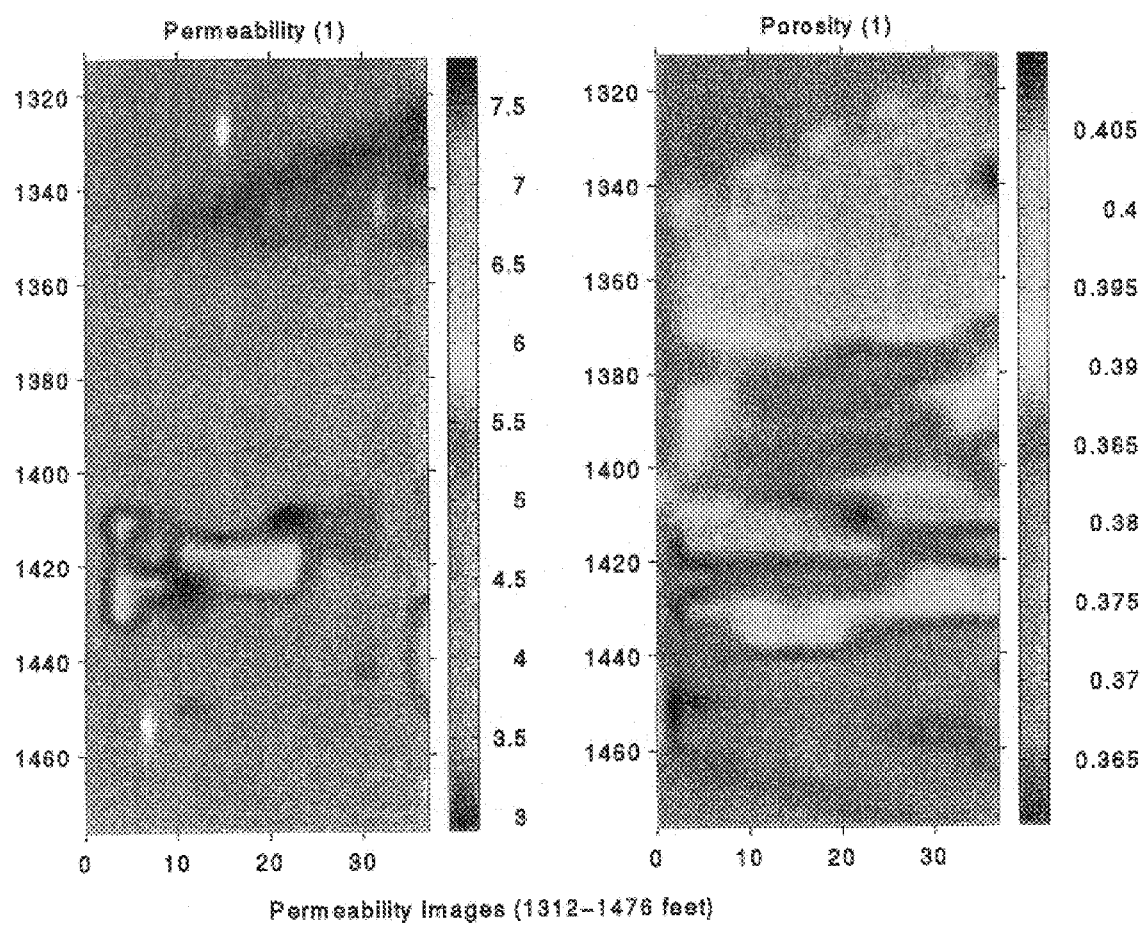
Figure 7F:
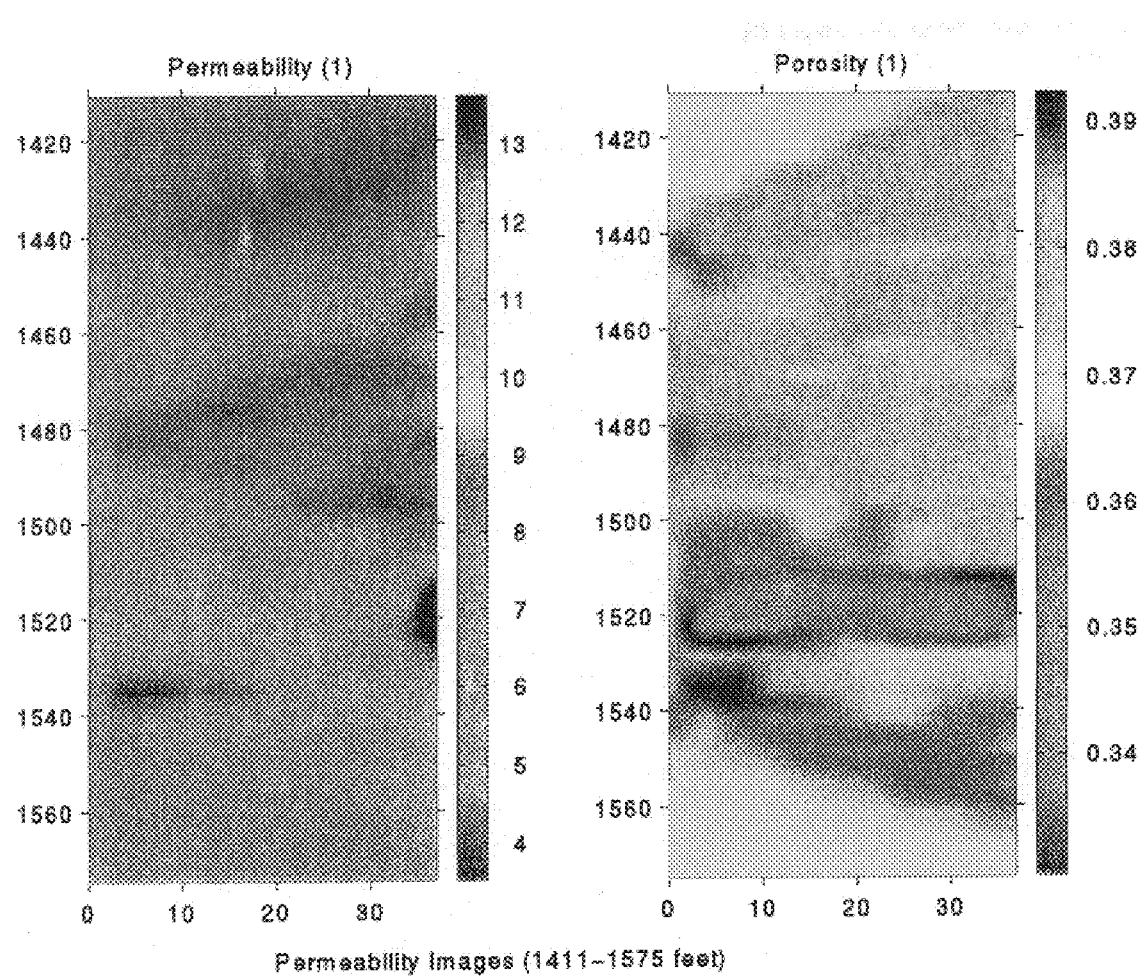
Figure 7G:
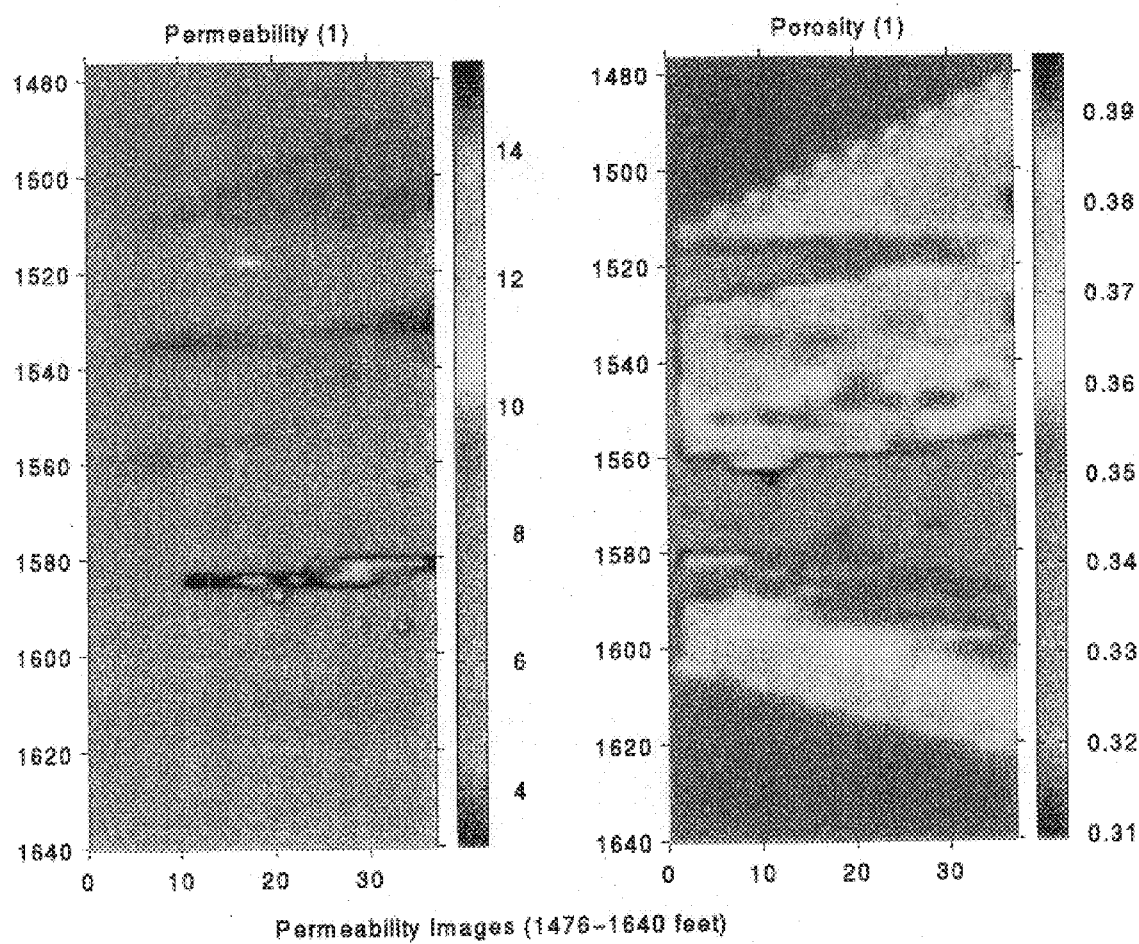
Figure 8A:
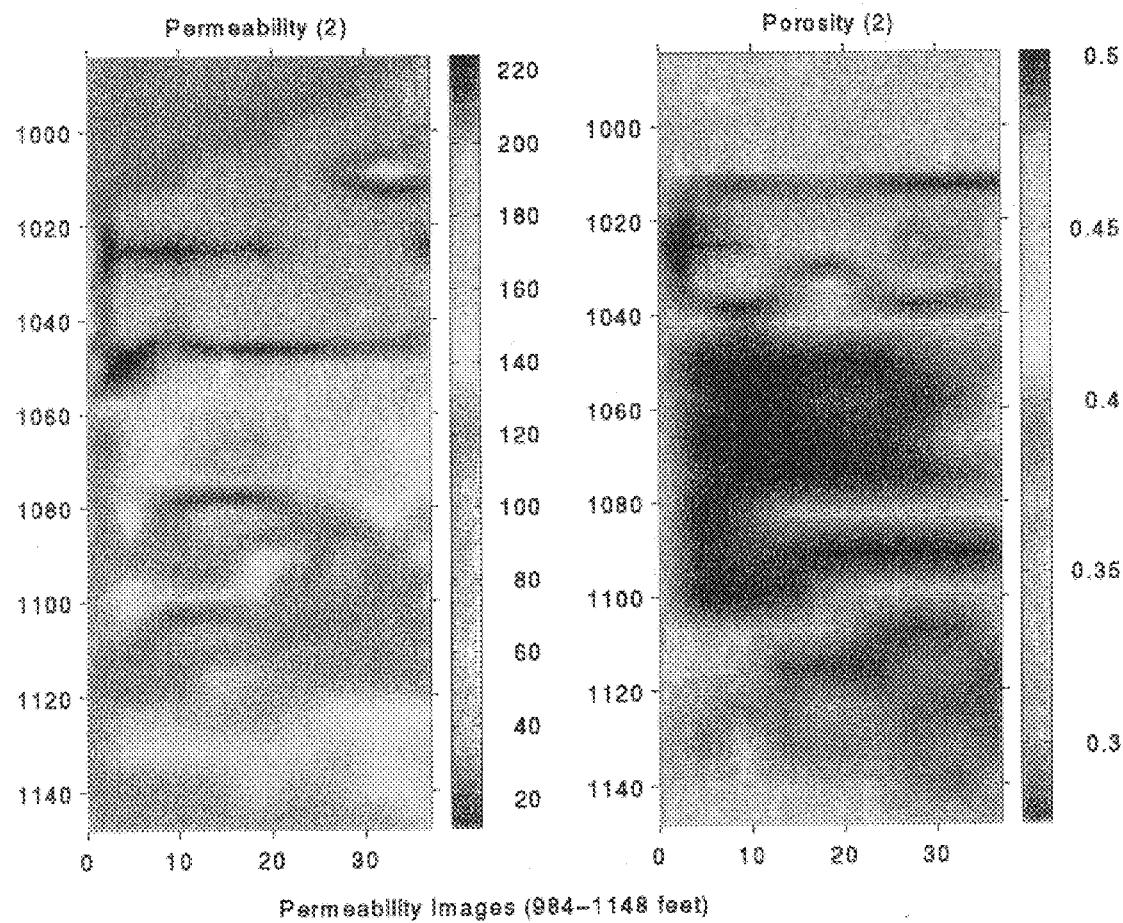
FIGS. 8(a)–(g) are graphs showing the second solution pair of the PRBS Cross- Well Tomography Test of the present invention.
Figure 8B:
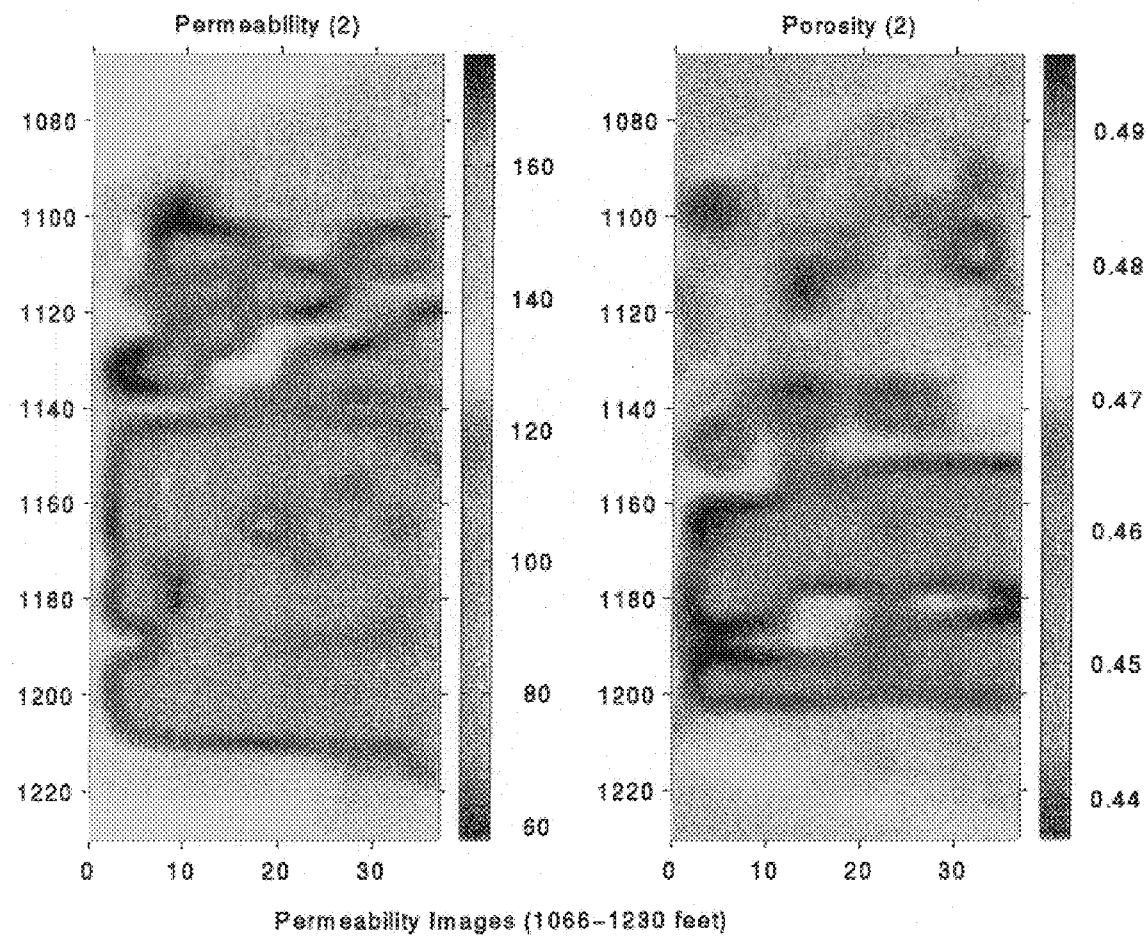
Figure 8C:
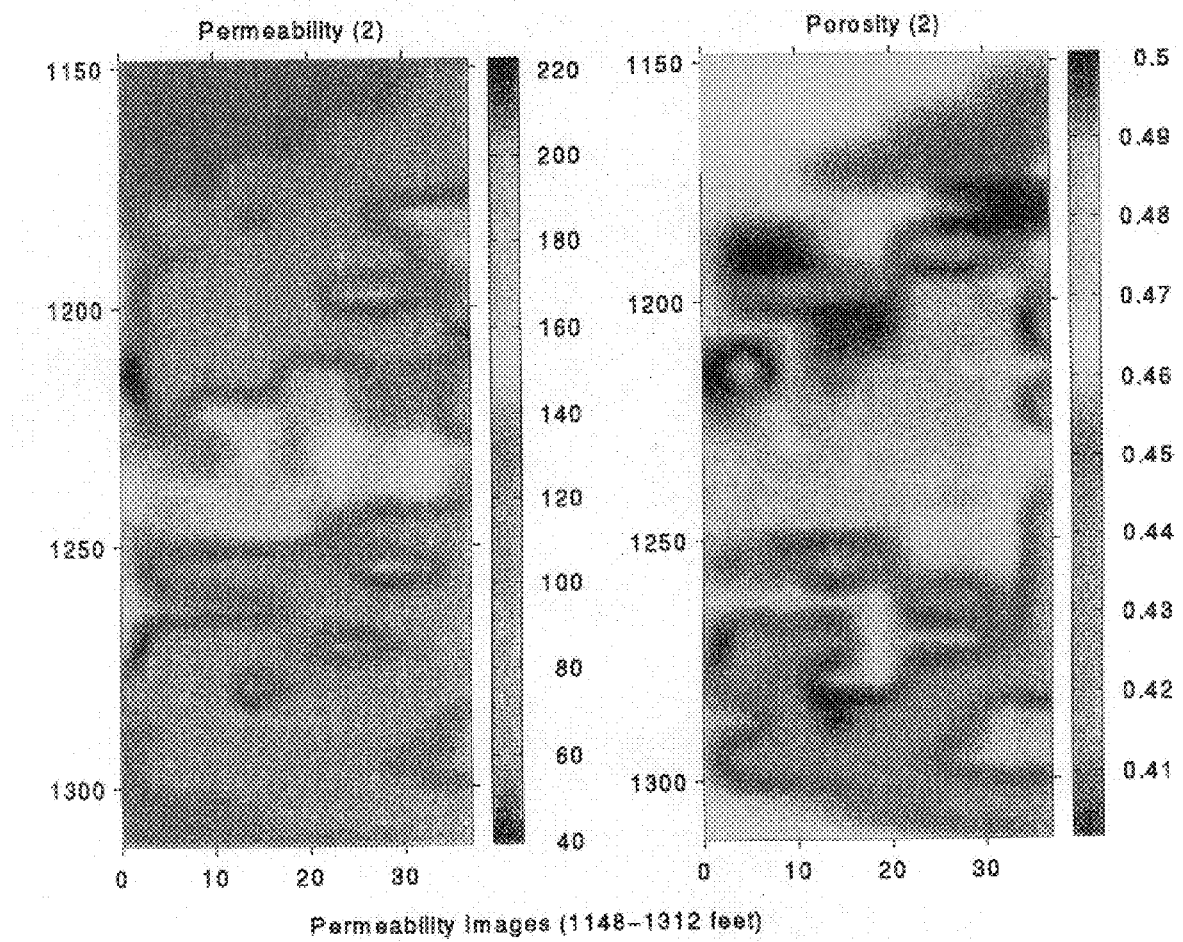
Figure 8D:
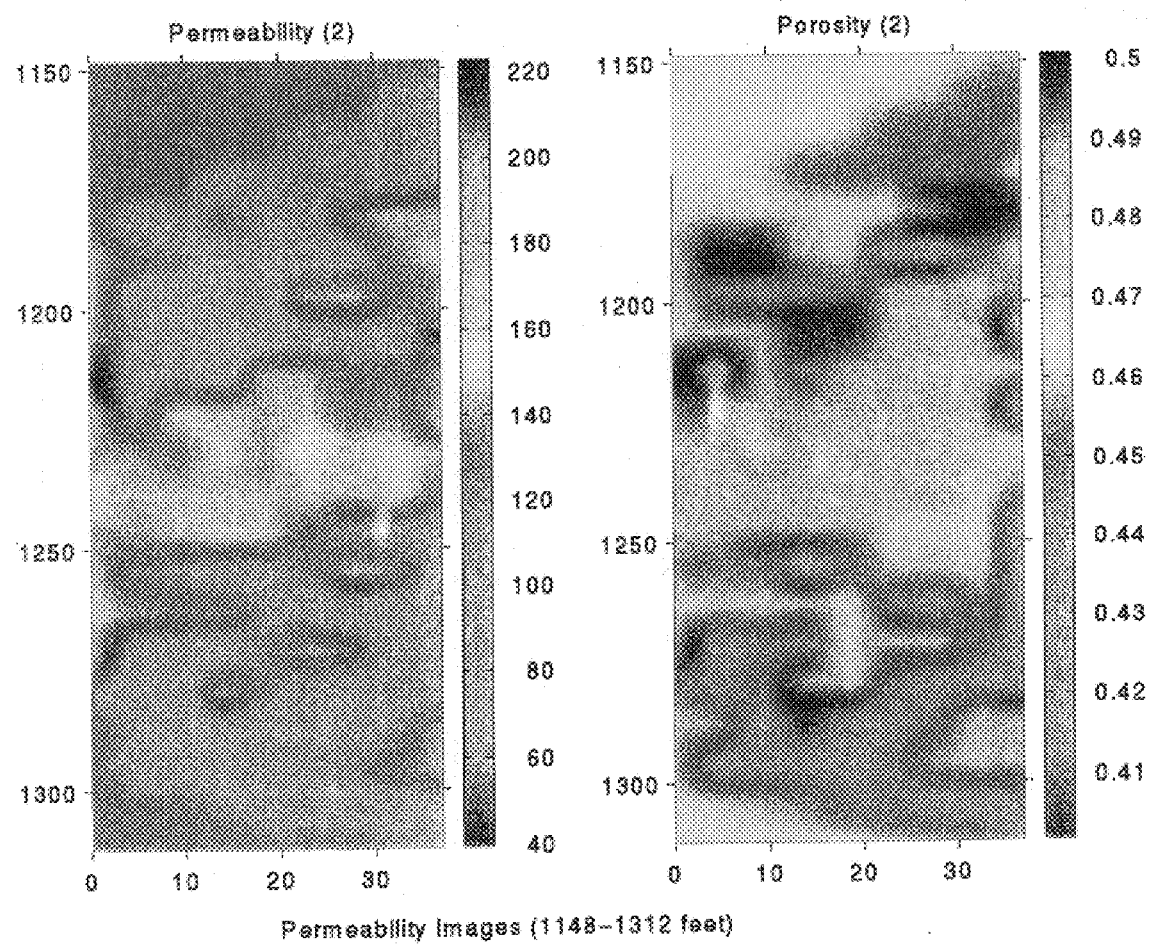
Figure 8E:
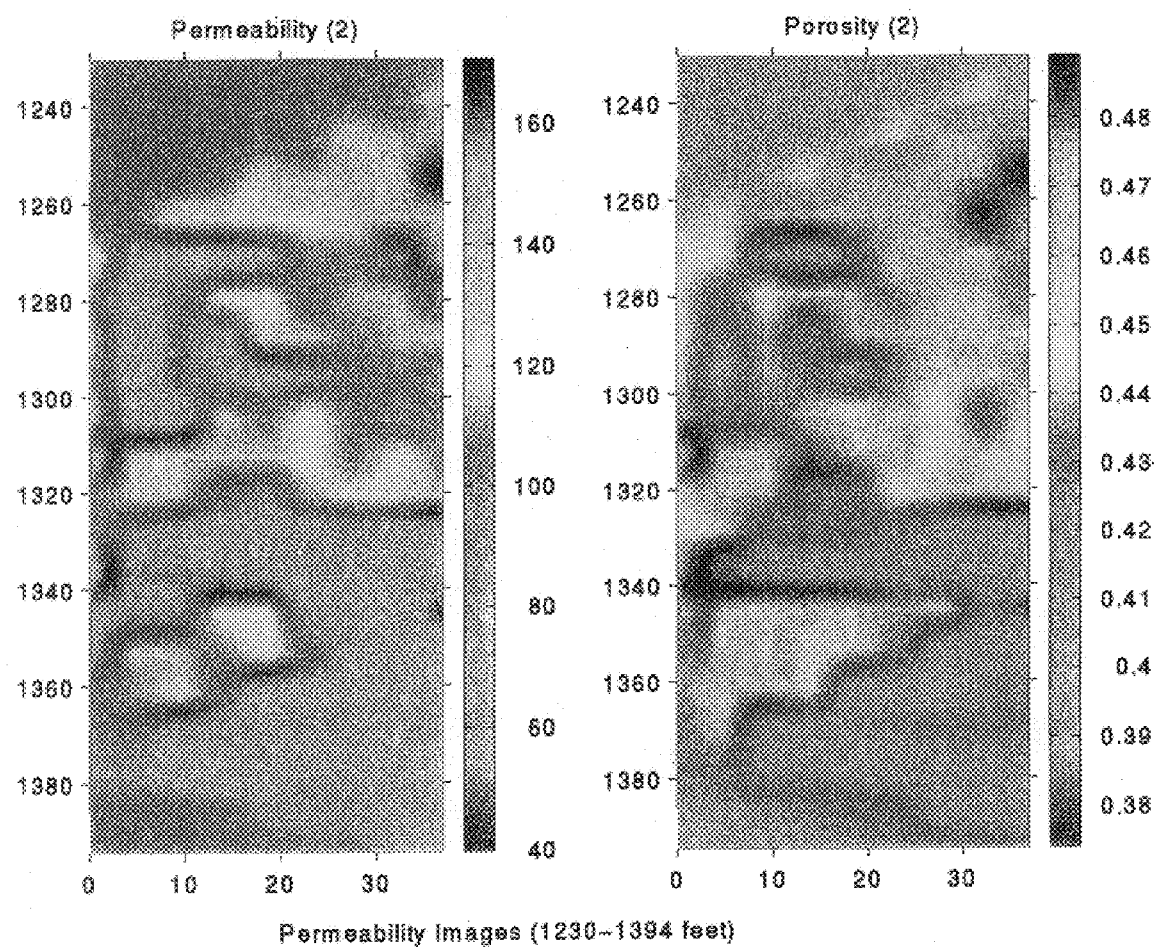
Figure 8F:
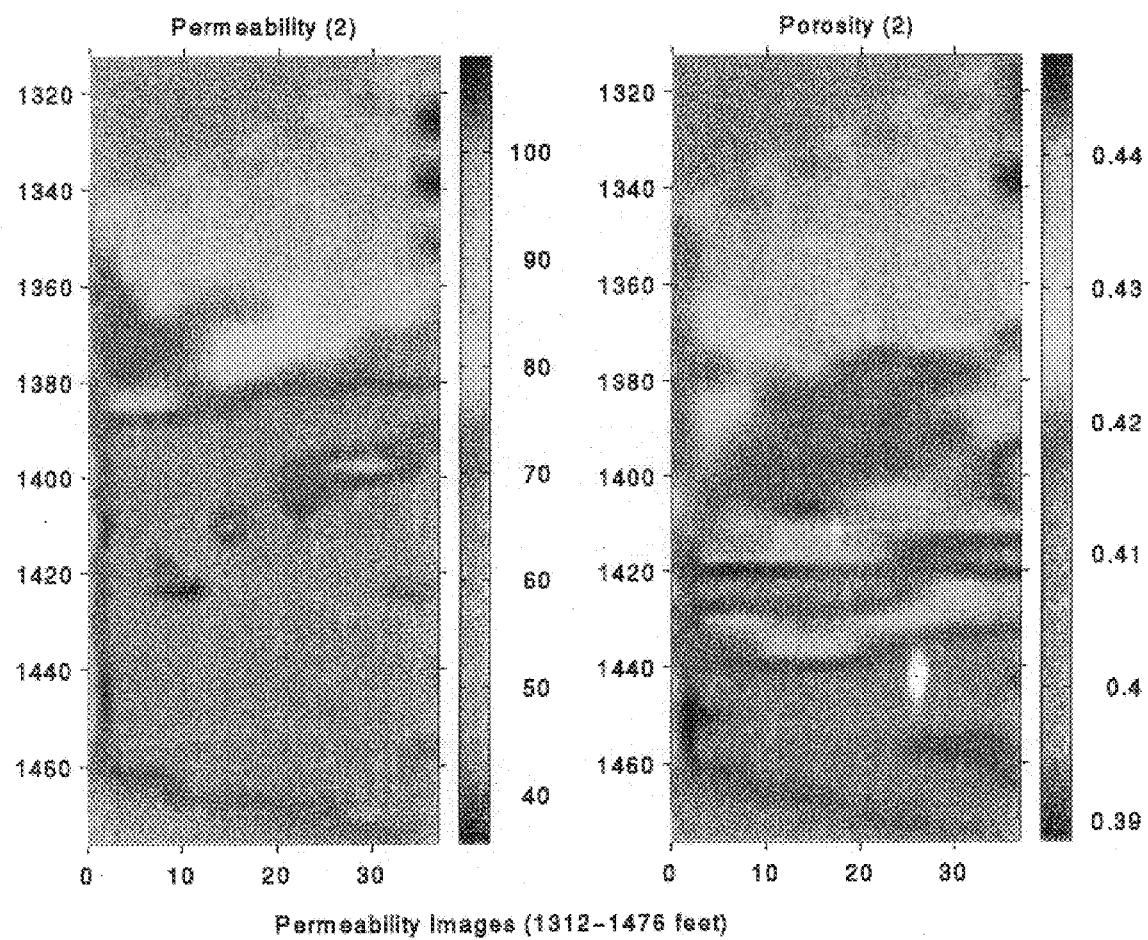
Figure 8G:
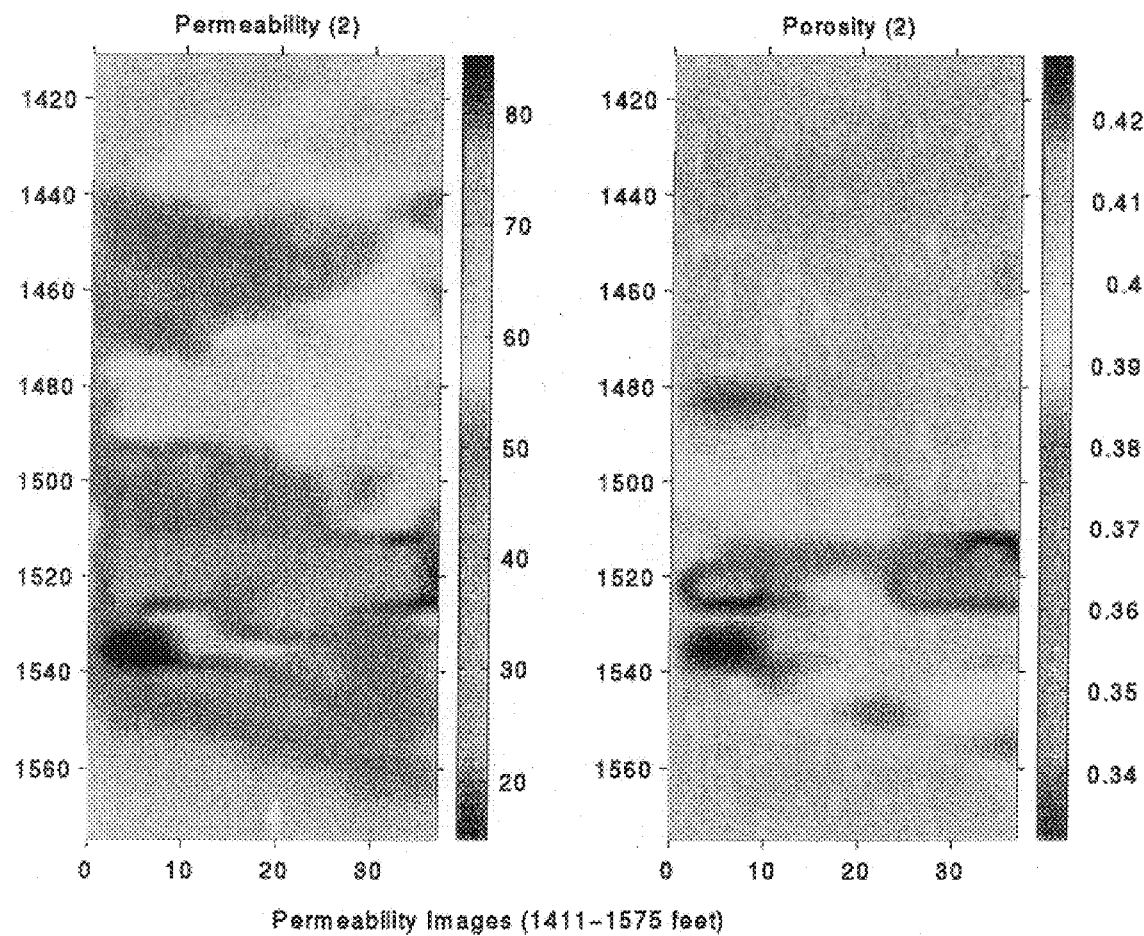
Figure 8H:
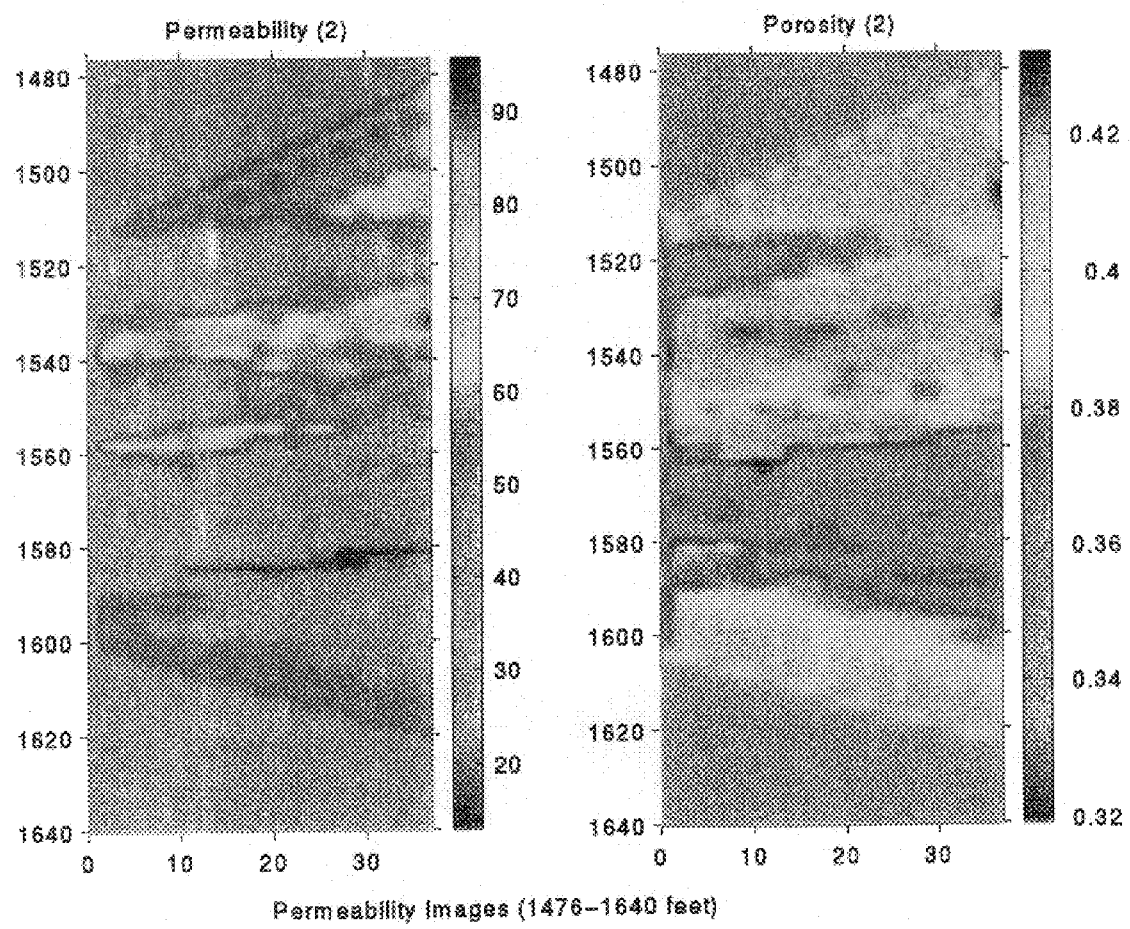

The ray paths used during the test and the inversion calculations in the manner of the present invention are shown in FIG. 4. A 4 kHz PRBS pulse was used as the source signal. An average of 100 PRBS signals received by each hydrophone were recorded at each source depth by the computer in the manner as described above in connection with the embodiment shown in FIG. 1. In addition to this depth sweep, five PRBS frequencies of 1, 2, 4, 6 and 12 kHz were used at 20 depths at 30.5 feet intervals between depths 921 feet and 1482 feet in order to be used for selecting the correct pair of permeability-porosity images out of the two possible solution pairs. The PRBS signal data received by Multi-Channel Hydrophone Array 12 and stored by Computer 1 were inverted for velocity end attenuation images in accordance with the inversion manipulation of the invention. In this regard, only the first arrival wave energy was used in the inversion. An example wave field measured by Multi-Channel Hydrophone Array 12 for a given source is shown in FIG. 5.

The quality of the data received was excellent. All of the attempted source-receiver ray paths were used in the version. Since it is very unusual to be able to use 100% of the measured ray paths (50% usage is considered very good), a high confidence level can be associated with the inverted images from this test.

The permeability imaging of the present invention was performed for a deep limestone layer having a depth between 1000 and 1600 feet using all of the source-receiver ray paths taken at the 4 kHz frequency. The resulting pair of velocity and attenuation images for the cross-section between two wells, 33 feet wide at depths of 1000–1600 feet is shown in FIGS. 6(a)–(i). The damped least squares method disclosed in Bregman, N. D., Bailey, R. C., and Chapman, C. H., "Crosshole Seismic Tomography," Geophysics, 54(2), 200–215, 1989, and Bregman, N. D., Chapman, C. H., and Bailey, R. C., "Travel Time and Amplitude Analysis in Seismic Tomography," J. Geoph. Res., 94(6), 7577–7587, 1989, the contents of which are hereby incorporated by reference herein, was used for the inversions. The entire depth sections were imaged in seven subsections, each approximately 150 feet high. Due to the ray paths used in the inversion calculations, the top and bottom of each subsection, about 30 feet deep, have triangle-shaped shadows. These shadow areas can be ignored, however.

The cross section between depths 1500 and 1600 feet had a spatial resolution of 1.5 feet, while the rest of the cross section (between 1500 feet and 1000 feet) had a spatial resolution of 60—corresponding to the source and hydrophone spacing used during the test.

Next, the measured pair of velocity-attenuation images shown in FIGS. 6(a)–(i) were transformed into a pair of permeability-porosity images. The Biot theory universal geoacoustic model described above for the limestone model was used for this transformation. The two possible solution image pairs of this transformation are shown in FIGS. 7(a)–(f) and 8(a)–(g). These figures are made up of seven subsections to cover the entire depths interval from 1000 to 1600 feet. The differences between the $\phi_1$ and $\phi_2$ images is small, ranging from 0.30 to 0.48 as compared to 0.30 to 0.50. The difference between the $k_1$ and $k_2$ images are, however, quite large: ranging from 2 to 14 darcys (1 darcy=$10^{-12}$ m$^2$) and $k_2$ ranging from 10 to 200 darcys.

Acoustical determination tests were then conducted to select the correct image pair from these transformations. At 20 depths within the interval 1000 feet to 1600 feet, cross-well transmission of PRBS pulses were made at 1, 2, 4, 8 and 12 kHz, as noted above. All of the multiple frequency data clearly indicated that the larger of the two permeability image pair is the correct one. Thus, the image pair shown in FIG. 8 was determined to be the correct one for this case.

Figure 9A:
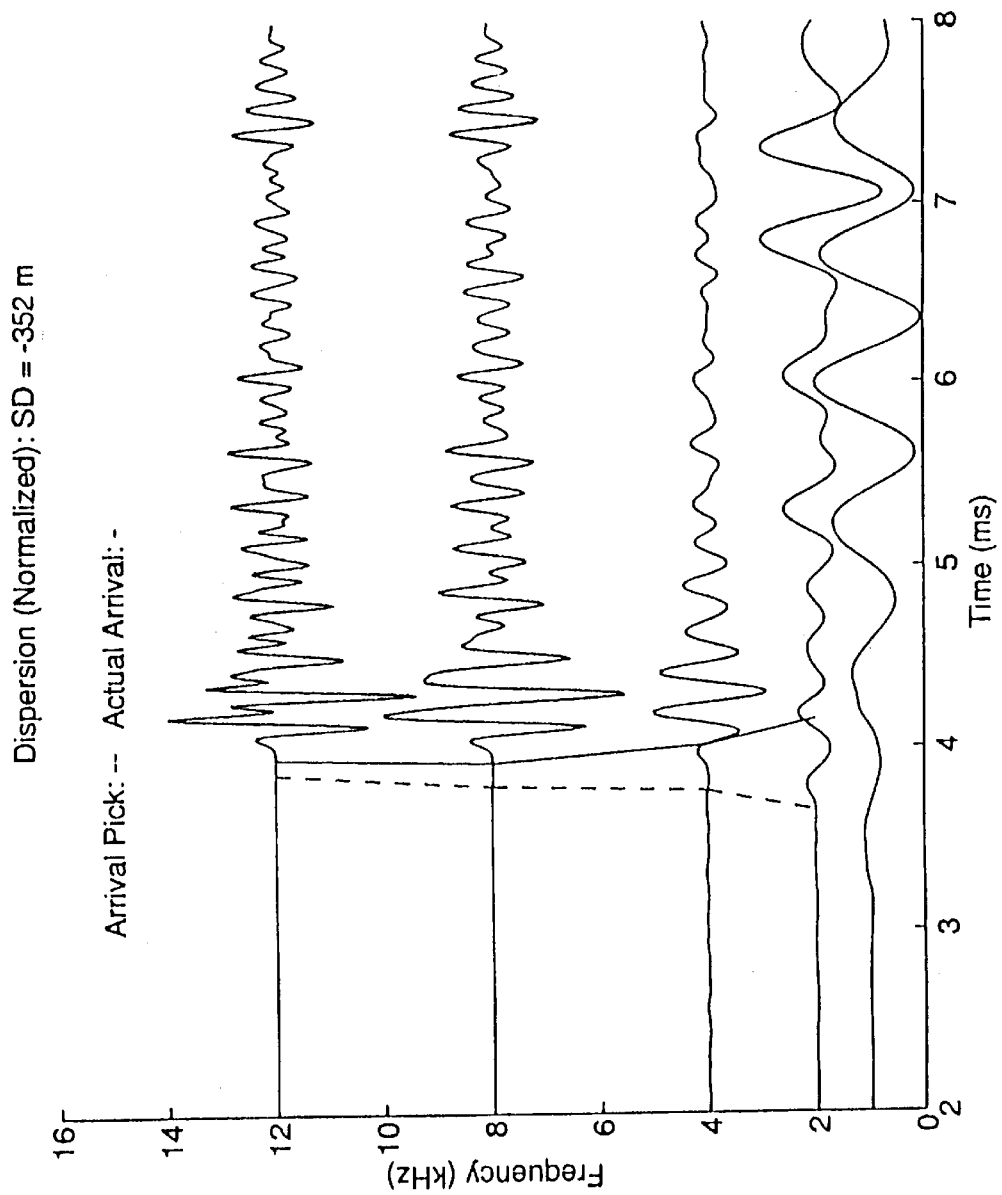
FIGS. 9(a)–(b) are graphs showing the dispersion of an acoustical signal at different frequencies during the PRBS Cross-Well Tomography Test of the present invention.
Figure 9B:
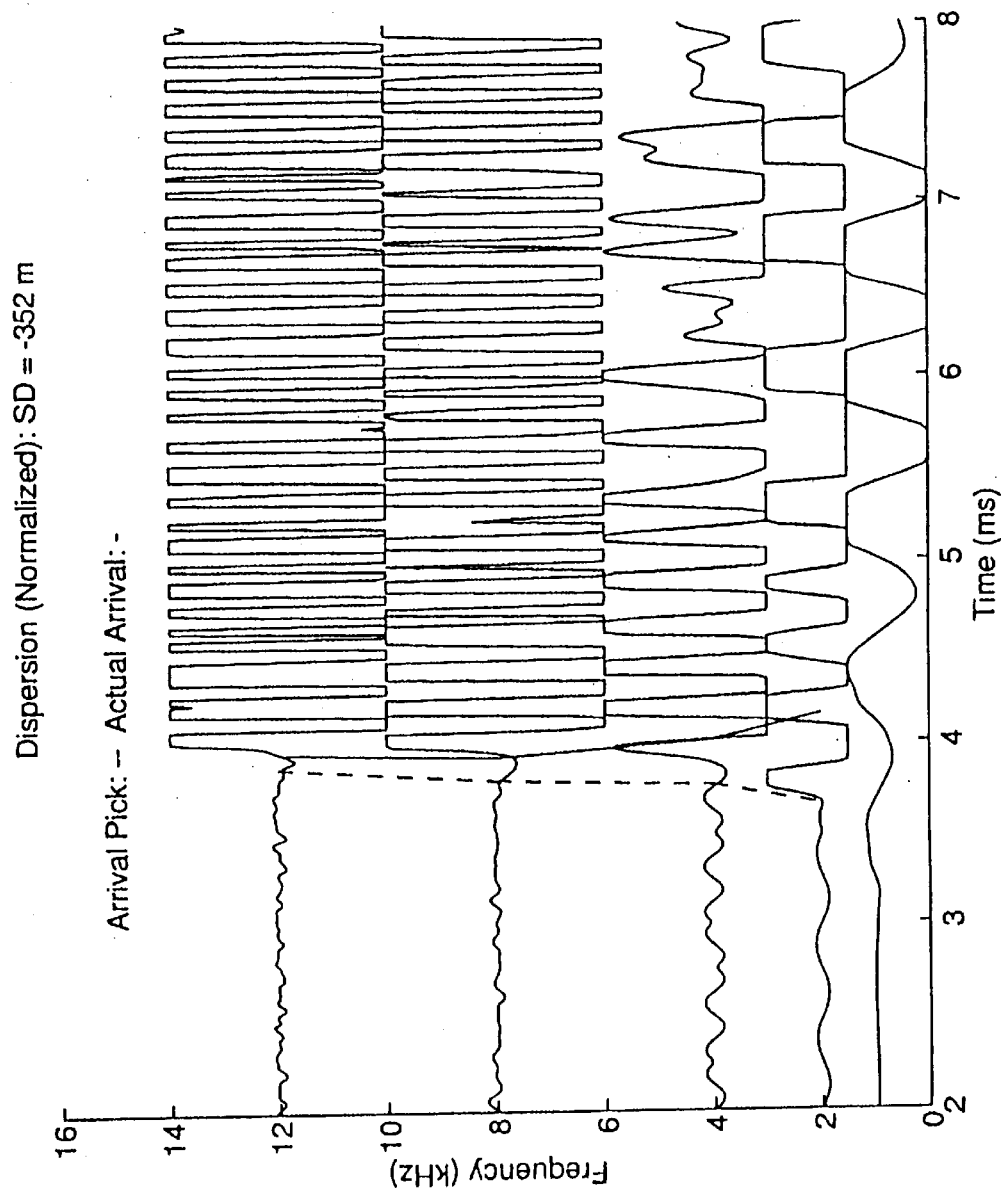

This was verified in the following matter. At depths z=1154 feet, the V and 1/Q data at PRBS frequencies 1, 2, 4, 8, and 12 kHz are: V=[2.862e+003, 2.88e+003 2.814e+003, 2.71e+003] m/s, and 1/Q=[1.33e−002, 2.394e−002, 4.05e−002, 6.47e−002]. The 1 kHz data were ignored because they were influenced by the near field effect, i.e., the wavelength of 3–4 m is not considered small compared to the source-receiver distance of 11 m. These data were extracted from the measured permeability as shown in FIGS. 9(a) and (b), which show a clear dispersion. The broken lines in the figures show the first breaks of the correlated PRBS time data and the solid lines show the actual first arrival time, which is 1/f later than the first break by definition.

Figure 10:
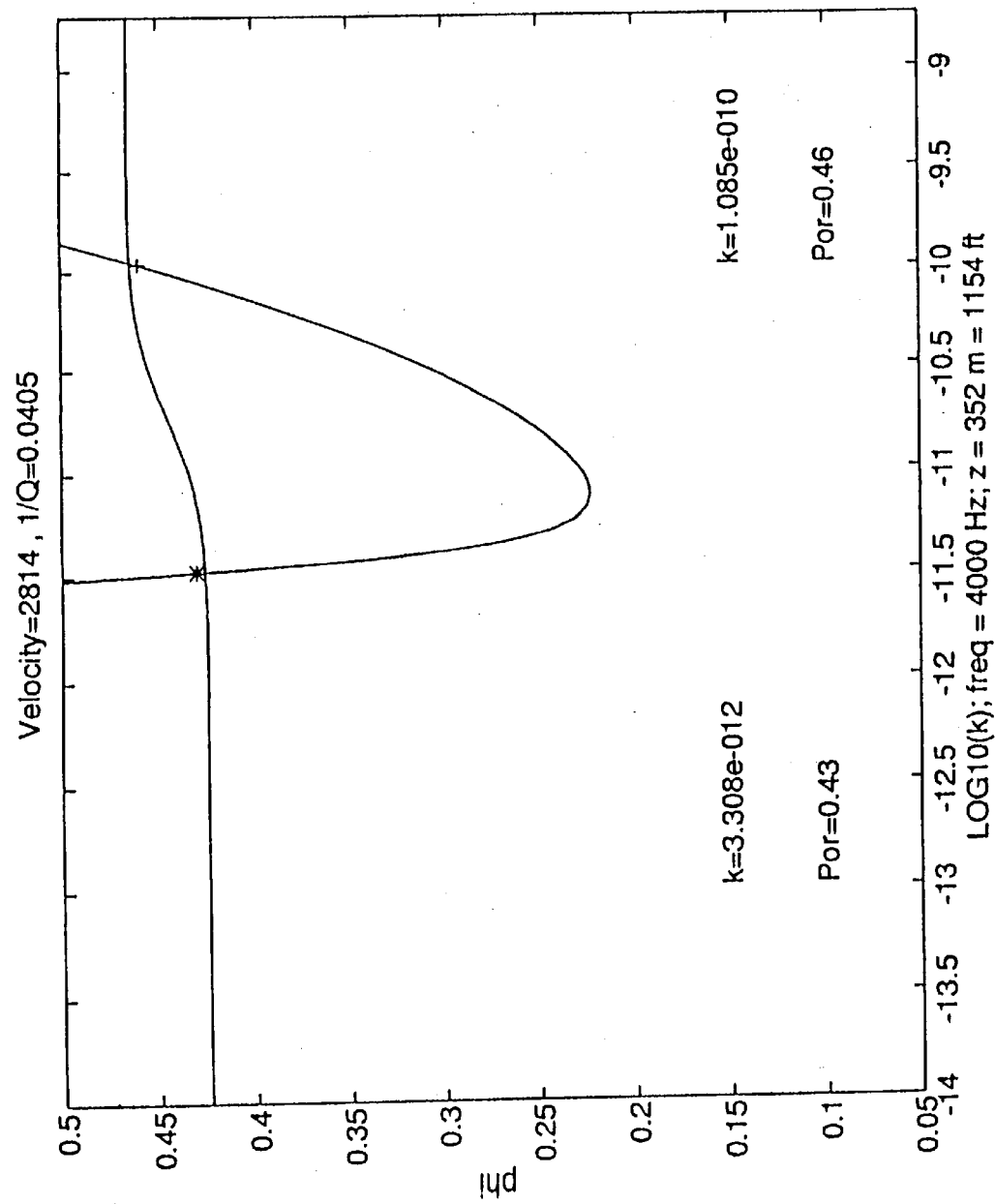
FIG. 10 is a graph showing velocity and attenuation solutions at a signal frequency of 4 kHz for the PRBS Cross-Well Tomography Test of the present invention.
Figure 11:
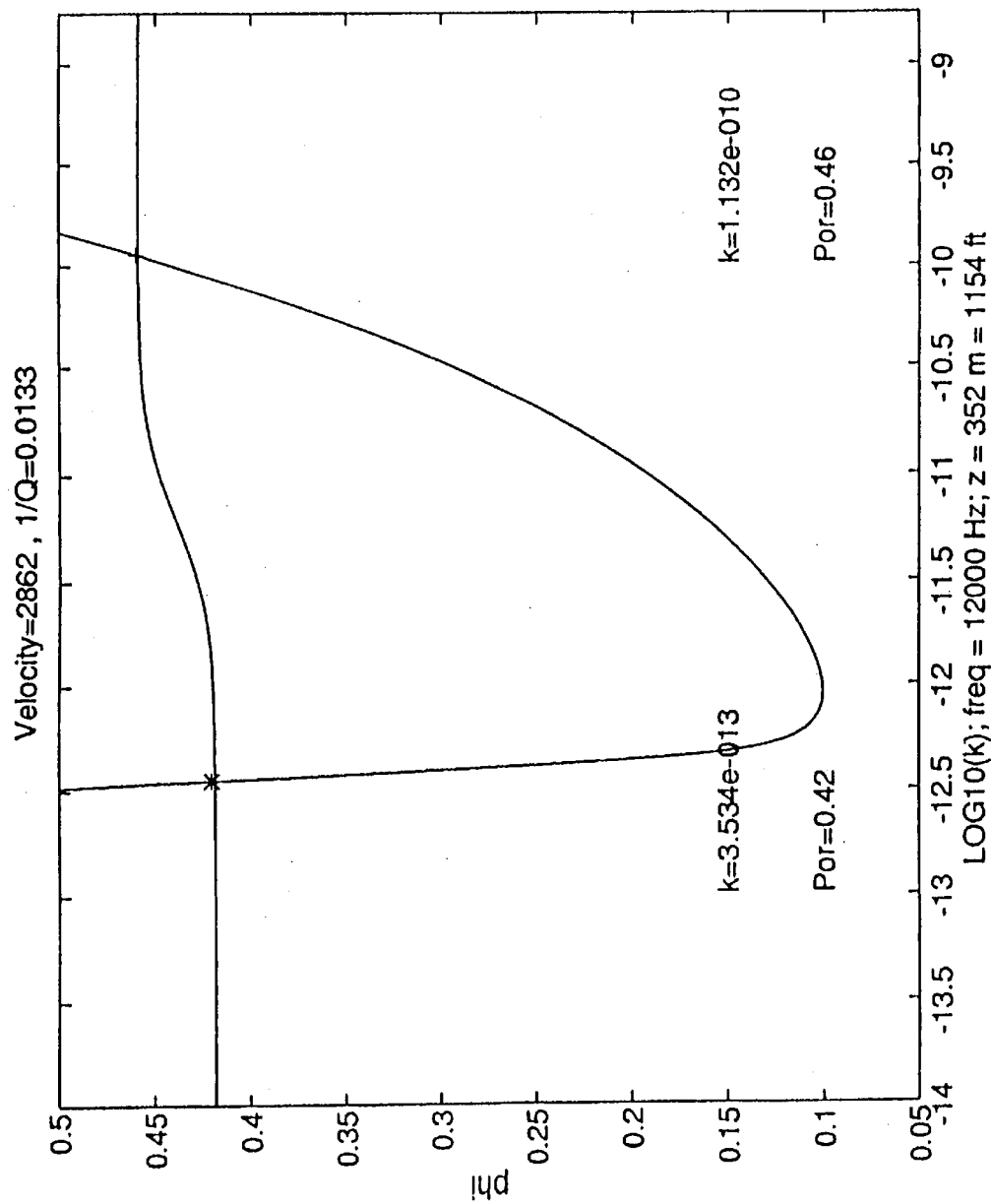
FIG. 11 is a graph showing velocity and attenuation solutions at a signal frequency of 12 kHz for the PRBS Cross-Well Tomography Test of the present invention.

From the 4 kHz data, the limestone model predicts the two possible [k, φ] solutions, which are shown in FIG. 10. On the other hand, the 12 kHz data, predicts the two possible [k, φ] solutions shown in FIG. 11. Comparing the 4 kHz and 12 kHz solutions shows that the [$k_2$, $\phi_2$] solutions coincide with each other, within the small level of error introduced by acoustic measuring devices. In sharp contrast, the other solution pairs are more than one order of magnitude different from each other.

This verifies that the second pair of the 4 kHz solution [$k_2$, $\phi_2$] is the correct permeability and porosity at this depth. These values agree well with the permeability image and porosity images in FIGS. 8(a)–(g) at a depth of 1154 feet.

These results were even further verified by conducting pumping tests, Packer tests, and through comparison with the Dow-Hole Porosity logs, discussed below.

Pumping Test Verification

Figure 12:
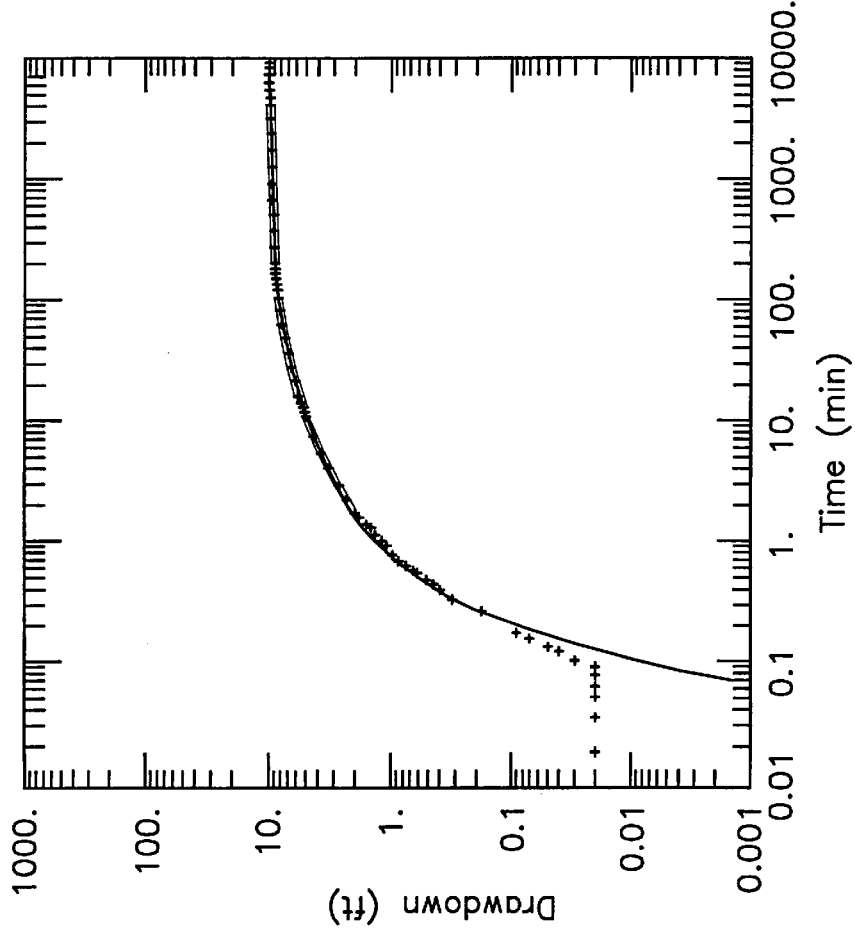
FIG. 12 is a graph showing pumping test data for verification of the PRBS Cross-Well Tomography Test of the present invention.

The pumping test is considered the most accurate method to measure the permeability of a sediment layer. Well BF-5 was used to pump out water at a constant rate from either of the two at intervals at a time for about a week while making water level observation at well BF-4. The pumping test data for the lower test interval located at depths 1500 to 1600 feet is shown in FIG. 12.

Figure 13:
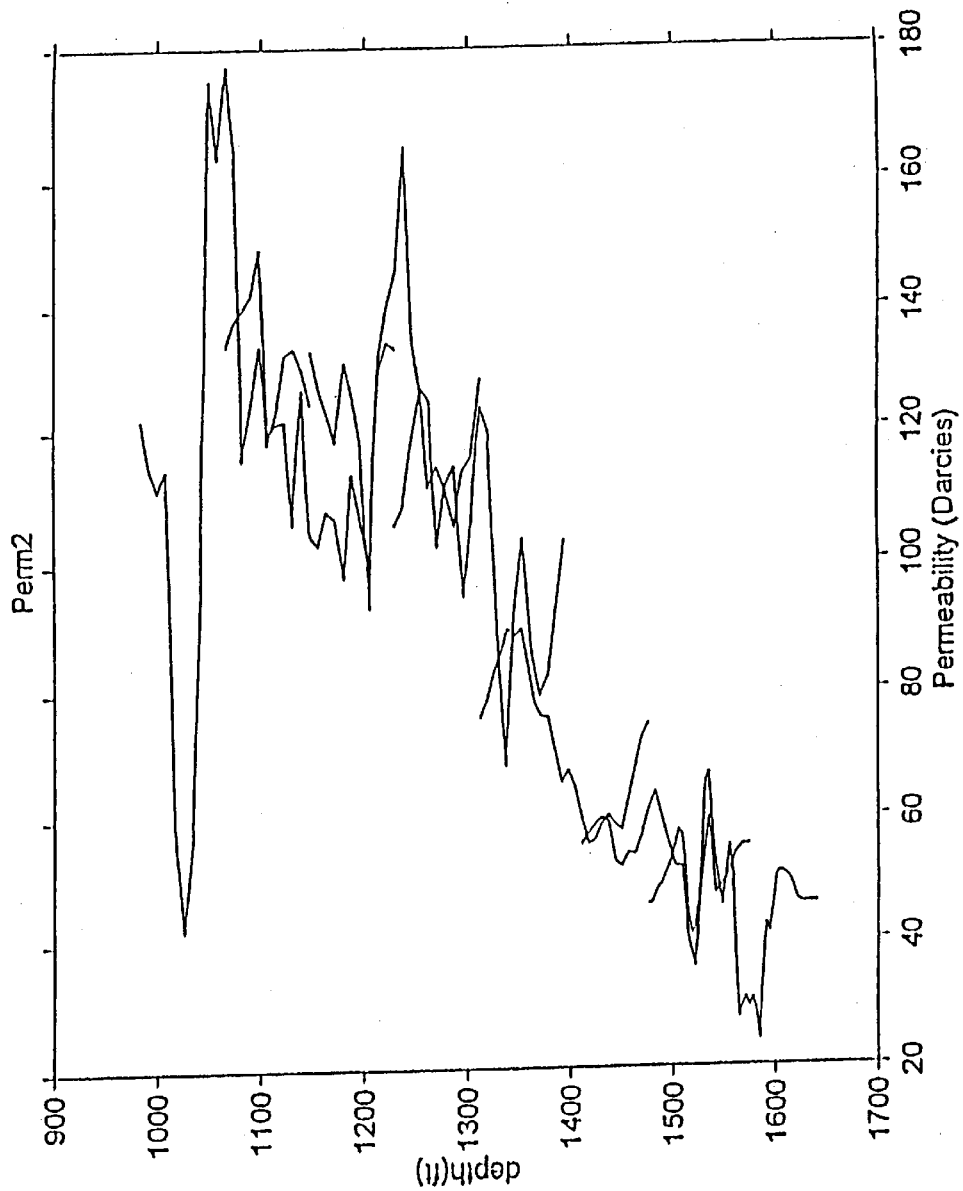
FIG. 13 is a graph showing the horizontally averaged permeability vs. depth calculated from the permeability image of the PRBS Cross-Well Tomography Test of the present invention.

The intrinsic permeability averaged over this depth interval is 33.2 darcys. Similarly, the pumping test made at the upper test layer at depth 1100 to 1168 feet measured the average permeability of 89.0 darcys. The permeability image obtained in the matter of the present invention, shown in FIG. 8, agreed well with the two values of the average permeability measured by the pumping tests. Moreover, the permeability image shows significant heterogeneity both horizontally as well as vertically. The permeability varies for about 2 to 60 darcys in the lower pumping test layer (1500 to 1600 feet) and from about 5 to 150 darcys in upper pumping test layer (1100 to 1168 feet) according to the physically imaged permeability structure shown in FIG. 8. The horizontally averaged permeability vs. depth was calculated from this permeability image is shown in FIG. 13 to aid in the verification.

The acoustically obtained permeability profile shows that the permeability varies from 22 to 60 darcys with an average of about 35 darcys at the lower pumping test layer. The acoustically obtained permeability logs shows that the permeability varies from 90 to 140 darcys with mean of about 105 darcys. These acoustically measured permeability profiles are in excellent agreement with the permeability values measured by the pumping test, indicating that the system of the present invention which determines the permeability image using a single frequency is very accurate.

Packer Test Verification

Packer tests were conducted at six depth levels in well BF-5 when it was drilled and before the steel casing was put in place. Two of the six Packer depth levels, 1000 to 1031 feet and 1494 to 1540 feet are within the PRBS cross-well tomography cross-section, providing additional comparisons to make with the physical image permeability structure achieved in the manner of the present invention (shown in FIG. 8).

The Packer test was conducted by measuring the permeability of a layer of sediment isolated in the bore hole by an upper and a lower inflatable rubber packer. The flow rate of water pumped through the packer-isolated sediment in the well is measured while maintaining the pack pressure at a constant level. During this process it is assumed that the injected water flow is contained within the horizontal layer without any invasion of the upper and lower layers.

However, in reality, some of the injected water would normally penetrate through the upper and lower layer. Therefore, the Packer test is used as only a tentative test to measure permeability. Nonetheless, the permeability values for the two depth intervals tested correlated closely with the acoustic permeability structure achieved in accordance with the present invention.

The Packer test measured a permeability value of 36.3 darcys for the depth interval 1494 to 1540 feet, and a permeability value of 244 darcys from 1000 to 1031 feet. The acoustically measured permeability image of the present invention shows the permeability varies 20 to 180 darcys within this depth level, with an average of about 60 darcys. This is about a quarter of the Packer test value of 244 darcys.

It is interesting to note, however, that just below the Packer test layer is a layer (1030 to 1080 feet) of very permeable limestone having an average permeability of about 200 darcys in the acoustical measured permeability image of the invention. It is possible that the injected water could have invaded through the very permeable layer during the Packer test, resulting in an erroneously large permeability value of 244 darcys at the test level.

Dow-Hole Test Verification

Figure 14:
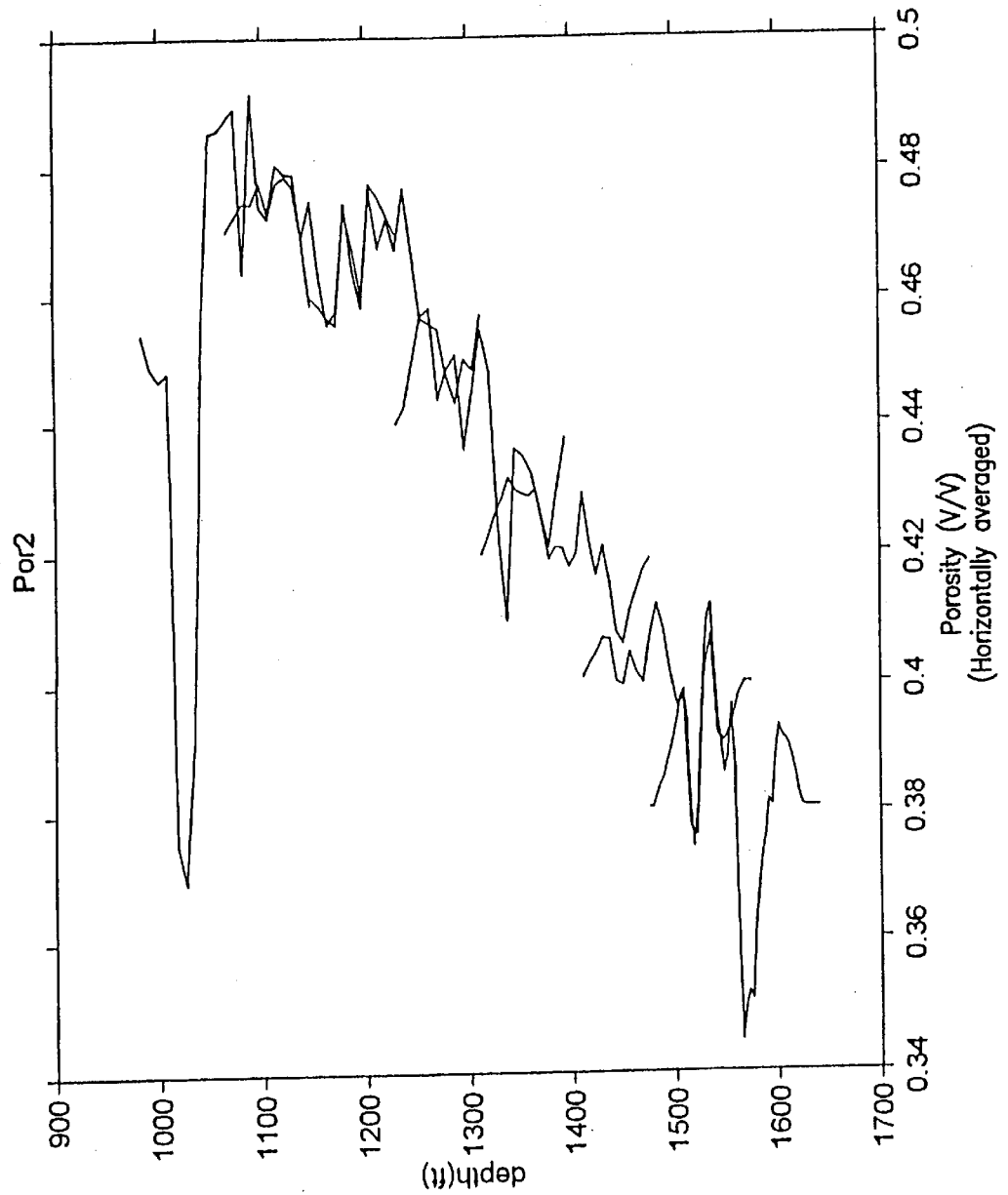
FIG. 14 is a graph showing the comparable horizontally averaged porosity vs. depth profile calculated from the porosity image of the PRBS Cross-Well Tomography Test of the present invention.

As previously noted, the method of the present invention provides a porosity image in addition to the permeability image. The horizontally averaged porosity vs. depth profile is shown in FIG. 14. The processing image shows strong heterogeneity horizontally and vertically, with the porosity value ranging from 0.32 to 0.50. The trend is that porosity decreases as the burial depth increases within the limestone formation for depths between 1000 to 1600 feet.

Figure 15:
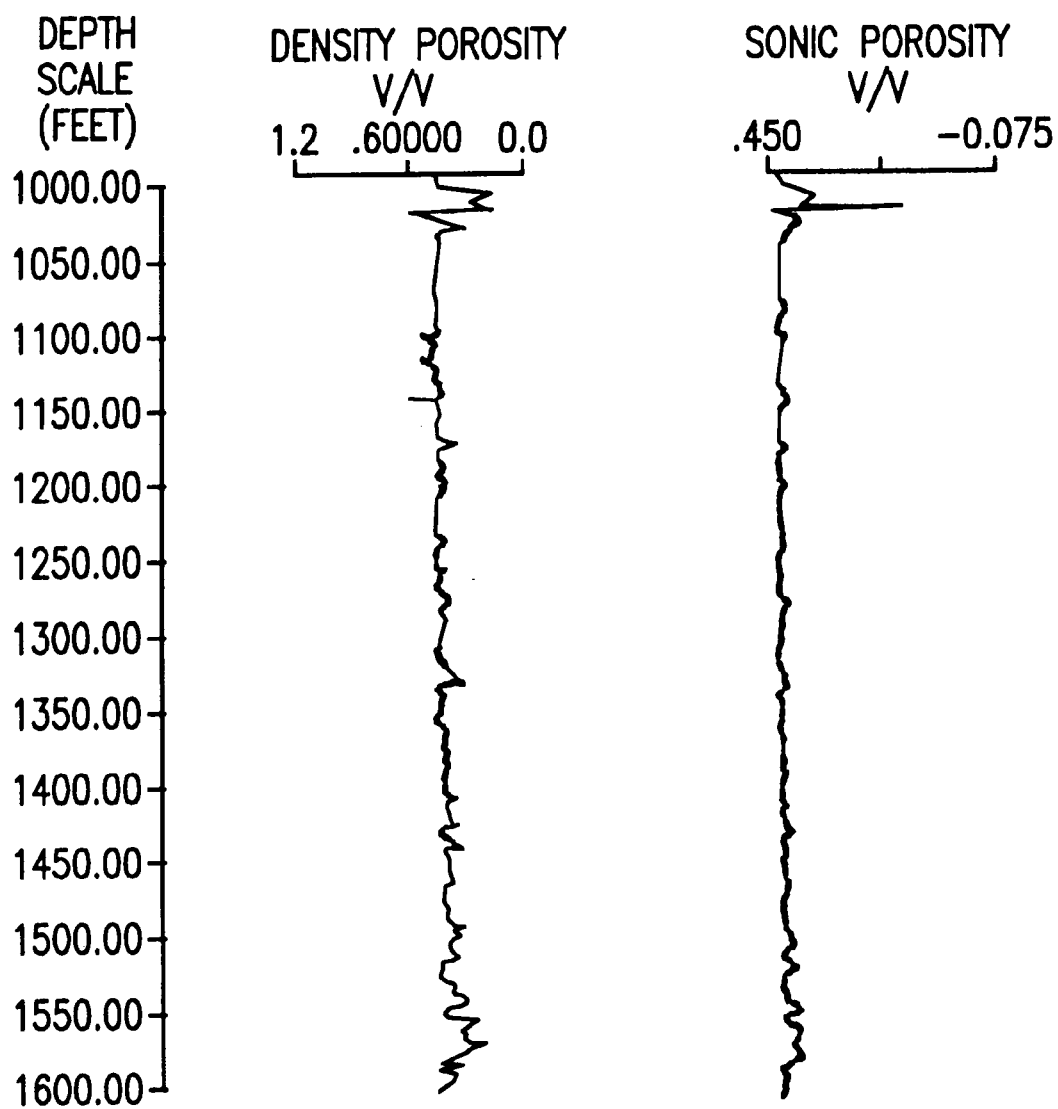
FIG. 15 is a graph showing the porosity profiles derived from the neutron density logging of the PRBS Cross-Well Tomography Test of the present invention.

Neutron density logging and sonic logging were conducted in the borehole of well BF-3 when it was drilled in 1993. This well is located about 85 feet to the West of the plane of the PRBS cross-well tomography across wells BF-1 and BF-2. The porosity profiles from this logging are shown in FIG. 15. As FIG. 15 indicates, the porosity measurements and the acoustically extracted porosity image obtained in the manner of the present invention, and the porosity profiles, are closely correlated for the entire depth between 1000 to 1600 feet. Thus, this also independently confirms the accuracy of the system of the present invention.

As previously stated, FIGS. 16(a) and 16(b) indicate comparisons at various frequencies of permeability and porosity when using the Super-K inversion technique, as compared to pumping tests and neutron density logs, FIG. 16(a) at 1157 feet depth and FIG. 16(b) at 1514 feet depth, at the SFWMD test site.

Although this invention has described in connection with specific forms thereof, it will be appreciated that a wide variety of equivalents may be substituted for the specific elements described herein without departing from the spirit and scope of the invention as described in the appended claims. For example, Computer 1 may be comprised of and configured with any number of electronic processing devices known to those of ordinary skill the art such as personal computers, notebook or laptop computers, and pre-programmed large scale integrated chips, etc. Piezoelectric Source 9 may be replaced with a number of similar electromechanical transducers for generating the acoustical signal. The computer programming code operating Computer 1 may be stored in Temporary Storage 6, Mass Storage 7, some other storage device, or in Real-Time Processor 4 itself.

What is claimed is:

1. In a non-destructive method of measuring physical characteristics of a medium, the steps which comprise:
   (a) generating a pseudo-random code;
   (b) generating a pseudo-random acoustic signal based upon said pseudo-random code;
   (c) transmitting said pseudo-random acoustic signal into and through said medium;
   (d) receiving said pseudo-random acoustic signal;
   (e) processing said received pseudo-random acoustic signal to obtain an image of the velocity and attenuation of said pseudo-random acoustic signal; and
   (f) inverting said image by quadratic equation to obtain an image that represents said physical characteristics of said medium.

2. The method defined in claim 1 wherein said image of the velocity and attenuation of said pseudo-random acoustic signal is inverted by determining a universal geoacoustic model of said medium for a set of measured data; solving said model for said measured data to obtain a pair of results for said physical characteristics; and determining the one of said pair of said results which is correctly indicative of said physical characteristics of said medium.

3. The method defined in claim 2 wherein said measured data comprises compression wave velocity, compression wave attenuation, and compression wave frequency.

4. The method defined in claim 1, wherein said acoustic signal is generated and transmitted using at least one piezoelectric transducer.

5. The method defined in claim 1, wherein said acoustic signal is received by a plurality of hydrophones.

6. The method defined in claim 5 wherein said hydrophones are equally spaced apart from each other.

7. The method defined in claim 1 wherein said frequency is selected from the group consisting of about 1,2,4,8 and 12 kHz.

8. The method defined in claim 1 wherein said physical characteristics include one or more of the group consisting of medium permeability and medium porosity.

9. In a non-destructive method of measuring physical characteristics of a medium, the steps which comprise:
   (a) generating a pseudo-random code;
   (b) generating a pseudo-random acoustic signal based upon said pseudo-random code;
   (c) transmitting said pseudo-random acoustic signal into said medium;
   (d) receiving velocity and attenuation images from said pseudo-random acoustic signal;
   (e) processing said received pseudo-random acoustic signal bv inversion in a quadratic equation to obtain an image of the said physical characteristics;
   (f) determining a universal geoacoustic model of said medium for a set of measured data;
   (g) solving said model for said measured data to obtain a pair of velocity and attenuation physical characteristic results; and
   (h) determining the one of said pair of physical characteristic results which is correctly indicative of said physical characteristics of said medium.

10. In a non-destructive method of measuring physical characteristics of a medium, the steps which comprise:
    (a) generating a pseudo-random code;
    (b) generating a pseudo-random acoustic signal based upon said pseudo-random code;
    (c) transmitting said pseudo-random acoustic signal into and through said medium;
    (d) receiving said pseudo-random acoustic signal;
    (e) processing said received pseudo-random acoustic signal by applying an inversion process upon a pair of sound velocity and attenuation images to obtain an inverted image of the velocity and attenuation of said acoustic signal;
    (f) determining a universal geoacoustic model of said medium for measured data, said measured data comprising velocity, attenuation, and frequency of said acoustic signal;
    (g) solving said model for said set of measured data to obtain a pair of permeability-porosity results for said medium; and
    (h) determining the one of said pair of permeability-porosity results which is correctly indicative of said physical characteristics of said medium.

11. The method defined in either of claims 9 or 10 wherein said pseudo-random acoustic signal is transmitted at a single frequency selected from the group consisting of 1, 2, 4, 8, and 12 kHz.

* * * * *

UNITED STATES PATENT AND TRADEMARK OFFICE
CERTIFICATE OF CORRECTION

PATENT NO.: 6,061,300
DATED:     May 9, 2000
INVENTOR(S): Tokuo Yamamoto

It is certified that error appears in the above-identified patent and that said Letters Patent is hereby corrected as shown below:

Column 6, line 8, please change "$\{(1 - \varphi)\}$" to --$\{(1 - \varphi)/\varphi\}$--;
line 14, please change "$(\rho_x - \rho_f)$" to --$(\rho_s - \rho_f)$--;
line 32, please change "$V_P - A_0 - A_j\varphi - A_3c$, $V_S - B_0 - B_j\varphi - B_2c$" to
--$V_P = A_0 - A_j\varphi - A_3c$, $V_S = B_0 - B_j\varphi - B_2c$--; and
line 40, please change "$A_0 = 5.39$, $A_j = 2.02$;" to --$A_0 = 5.39$, $A_j = 7.08$, $A_2 = 2.02$;--.

In Column 8, line 40, please change "$\partial a/\partial x$," to --$\partial/\partial x$,--; and
line 67, please change "$(\rho_1 \rho_2 + \rho_z\rho)$" to --$(\rho_1 \rho_2 + \rho_a\rho)$--.

In Column 10, line 61, please change "transformation" to --transformations--; and
line 66, please change "pair" to --pairs--.

Signed and Sealed this

Third Day of April, 2001

Attest:

NICHOLAS P. GODICI

Attesting Officer

Acting Director of the United States Patent and Trademark Office